(12) United States Patent
Miyake

(10) Patent No.: US 12,035,132 B2
(45) Date of Patent: Jul. 9, 2024

(54) COMMUNICATION DEVICE AND COMPUTER PROGRAMS FOR COMMUNICATION DEVICE ESTABLISHING A WIRELESS CONNECTION WITH AN EXTERNAL DEVICE IN A STATE IN WHICH ANOTHER WIRELESS CONNECTION HAS BEEN ESTABLISHED WITH ANOTHER EXTERNAL DEVICE

(71) Applicant: Brother Kogyo Kabushiki Kaisha, Nagoya (JP)

(72) Inventor: Takeshi Miyake, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/145,292

(22) Filed: Dec. 22, 2022

(65) Prior Publication Data

US 2023/0117175 A1 Apr. 20, 2023

Related U.S. Application Data

(63) Continuation of application No. 17/681,360, filed on Feb. 25, 2022, now Pat. No. 11,632,822, which is a (Continued)

(30) Foreign Application Priority Data

Mar. 30, 2018 (JP) ................................ 2018-068823

(51) Int. Cl.
*G06F 3/12* (2006.01)
*H04L 9/40* (2022.01)
(Continued)

(52) U.S. Cl.
CPC .......... *H04W 76/34* (2018.02); *G06F 3/1204* (2013.01); *G06F 3/1231* (2013.01);
(Continued)

(58) Field of Classification Search
CPC ..... G06F 3/1236; G06F 3/1231; G06F 3/1292
See application file for complete search history.

(56) References Cited

U.S. PATENT DOCUMENTS

| 4,723,284 A | 2/1988 | Munck et al. |
| 2008/0024591 A1 | 1/2008 | Doi et al. |

(Continued)

FOREIGN PATENT DOCUMENTS

| CN | 102047266 A | 5/2011 |
| CN | 103828443 A | 5/2014 |

(Continued)

OTHER PUBLICATIONS

"Device Provisioning Protocol Technical Specification Version 0.2.11" Wi-Fi Alliance Proprietary, 2017 Wi-Fi Alliance, pp. 1-133.
(Continued)

*Primary Examiner* — Nicholas Pachol
(74) *Attorney, Agent, or Firm* — Banner & Witcoff, Ltd.

(57) ABSTRACT

A communication device (e.g., a printer) may establish a wireless connection in accordance with a device provisioning protocol (DPP) between the communication device and an external device (e.g., access point) in a state in which a wireless connection has already been established between the communication device and another external device (e.g., access point). The communication device may disconnect its wireless interface from a first external device prior to connecting to a second external device.

20 Claims, 15 Drawing Sheets

Related U.S. Application Data continuation of application No. 16/371,453, filed on Apr. 1, 2019, now Pat. No. 11,265,962.

(51) Int. Cl.
| | |
|---|---|
| *H04W 12/0431* | (2021.01) |
| *H04W 12/06* | (2021.01) |
| *H04W 12/069* | (2021.01) |
| *H04W 12/55* | (2021.01) |
| *H04W 76/18* | (2018.01) |
| *H04W 76/34* | (2018.01) |

(52) U.S. Cl.
CPC .......... *G06F 3/1236* (2013.01); *G06F 3/1292* (2013.01); *H04L 63/061* (2013.01); *H04W 12/0431* (2021.01); *H04W 12/06* (2013.01); *H04W 12/069* (2021.01); *H04W 12/55* (2021.01); *H04W 76/18* (2018.02)

(56) References Cited

U.S. PATENT DOCUMENTS

| | | |
|---|---|---|
| 2011/0072266 A1 | 3/2011 | Takayama et al. |
| 2012/0076069 A1 | 3/2012 | Ogura |
| 2013/0027741 A1 | 1/2013 | Liu |
| 2013/0067068 A1 | 3/2013 | Hassan et al. |
| 2013/0070644 A1 | 3/2013 | McCann et al. |
| 2014/0286242 A1 | 9/2014 | McCann et al. |
| 2014/0369232 A1 | 12/2014 | Kim et al. |
| 2015/0087278 A1 | 3/2015 | Kim et al. |
| 2015/0089624 A1 | 3/2015 | Kim et al. |
| 2015/0189023 A1 | 7/2015 | Kubota et al. |
| 2015/0189489 A1 | 7/2015 | Banno |
| 2015/0229475 A1 | 8/2015 | Benoit et al. |
| 2016/0054962 A1 | 2/2016 | Park |
| 2016/0192429 A1 | 6/2016 | Nogawa |
| 2016/0234213 A1 | 8/2016 | Kim et al. |
| 2017/0024596 A1 | 1/2017 | Goto |
| 2017/0026833 A1 | 1/2017 | Goto |
| 2017/0026900 A1 | 1/2017 | Goto |
| 2017/0086237 A1 | 3/2017 | Ando |
| 2017/0094451 A1 | 3/2017 | Terashita |
| 2017/0156110 A1 | 6/2017 | Ueno et al. |
| 2017/0202035 A1 | 7/2017 | Yokoyama et al. |
| 2017/0215066 A1 | 7/2017 | Tachibana |
| 2017/0215067 A1 | 7/2017 | Goto |
| 2017/0215070 A1 | 7/2017 | Sakai |
| 2017/0250835 A1 | 8/2017 | Kim et al. |
| 2017/0295448 A1 | 10/2017 | McCann et al. |
| 2017/0339548 A1 | 11/2017 | Moriya |
| 2017/0339734 A1 | 11/2017 | Sambe |
| 2018/0020353 A1 | 1/2018 | Bhandaru et al. |
| 2018/0042058 A1 | 2/2018 | McCann et al. |
| 2018/0069718 A1 | 3/2018 | Terao |
| 2018/0069851 A1 | 3/2018 | Terao |
| 2018/0077255 A1 | 3/2018 | Goto |
| 2018/0083795 A1 | 3/2018 | Zehler et al. |
| 2018/0124769 A1 | 5/2018 | Takahashi |
| 2018/0145961 A1 | 5/2018 | Azuma |
| 2018/0167283 A1 | 6/2018 | Moritomo |
| 2018/0248694 A1 | 8/2018 | Benoit et al. |
| 2018/0302792 A1 | 10/2018 | Zhang et al. |
| 2019/0159114 A1 | 5/2019 | McCann et al. |
| 2019/0166124 A1 | 5/2019 | Kim et al. |
| 2019/0196761 A1 | 6/2019 | Minakawa et al. |
| 2019/0215878 A1 | 7/2019 | Goto |
| 2019/0230613 A1 | 7/2019 | Kim et al. |
| 2019/0239036 A1 | 8/2019 | Morimoto |
| 2019/0274048 A1 | 9/2019 | Yamaki |
| 2019/0394744 A1 | 12/2019 | Kim et al. |
| 2020/0015084 A1 | 1/2020 | Sakai |
| 2022/0015161 A1 | 1/2022 | Goto |
| 2022/0053414 A1 | 2/2022 | McCann et al. |
| 2023/0099038 A1 | 3/2023 | Kim et al. |

FOREIGN PATENT DOCUMENTS

| | | | |
|---|---|---|---|
| CN | 105453671 | A | 3/2016 |
| CN | 105580310 | A | 5/2016 |
| CN | 105898830 | A | 8/2016 |
| CN | 105981031 | A | 9/2016 |
| CN | 106255176 | A | 12/2016 |
| CN | 107094294 | A | 8/2017 |
| CN | 107533601 | A | 1/2018 |
| CN | 107592629 | A | 1/2018 |
| EP | 1841260 | A2 | 10/2007 |
| EP | 2536245 | A2 | 12/2012 |
| JP | 2013-074578 | A | 4/2013 |
| JP | 2016-140001 | A | 8/2016 |
| JP | 2016-178687 | A | 10/2016 |
| JP | 2017-28454 | A | 2/2017 |
| JP | 2017-028461 | A | 2/2017 |
| JP | 2017-135517 | A | 8/2017 |
| JP | 2017-135520 | A | 8/2017 |
| JP | 2018-37978 | A | 3/2018 |
| JP | 2018-37979 | A | 3/2018 |
| WO | 2015/195978 | A1 | 12/2015 |
| WO | 2018/047653 | A1 | 3/2018 |

OTHER PUBLICATIONS

"Device Provisioning Protocol Specification Version 1.1" Wi-Fi Alliance Proprietary, 2018 Wi-Fi Alliance, pp. 1-124.
"Device Provisioning Protocol Specification Version 1.0" Wi-Fi Alliance Proprietary, 2018 Wi-Fi Alliance, pp. 1-124.
"Wi-Fi Device Provisioning Protocol (DPP) Technical Specification Version 0.0.23" Wi-Fi Alliance 2016, pp. 1-90.
Aug. 7, 2019—Extended European Search Report—App 19165575.2.
Aug. 6, 2019—Extended European Search Report—App 19165572.9.
Nov. 26, 2019—U.S. Notice of Allowance—U.S. Appl. No. 16/371,496.
Apr. 7, 2021—U.S. Non-final Office Action—U.S. Appl. No. 16/798,663.
Mar. 15, 2021—(EP) Examination Communication—App 19165572.9.
Aug. 26, 2021—U.S. Notice of Allowance—U.S. Appl. No. 16/798,663.
Mar. 8, 2022—(JP) Notice of Reasons for Refusal—App 2018-068823, Eng Tran.
Sep. 1, 2022—U.S. Non-Final Office Action—U.S. Appl. No. 17/531,872.
Dec. 19, 2022—U.S.—Notice of Allowance—U.S. Appl. No. 17/531,872.
Sep. 6, 2023—(CN) First Office Action—CN App 201910251088.7, Eng Tran.
Sep. 5, 2023—(CN) First Office Action—CN App 201910249680.3, Eng Tran.
Mar. 4, 2024—(US)—Non-final Office Action—U.S. Appl. No. 18/132,233.

Fig.7 (FIRST AND SECOND ILLUSTRATIVE EMBODIMENTS)

(FIRST AND SECOND ILLUSTRATIVE EMBODIMENTS)

(FIRST ILLUSTRATIVE EMBODIMENT : EXAMPLE CASE B)

Fig.10 (SECOND ILLUSTRATIVE EMBODIMENT)

(BOOTSTRAPPING AT T530)

(SECOND ILLUSTRATIVE EMBODIMENT: EXAMPLE CASE D)

(THIRD ILLUSTRATIVE EMBODIMENT)

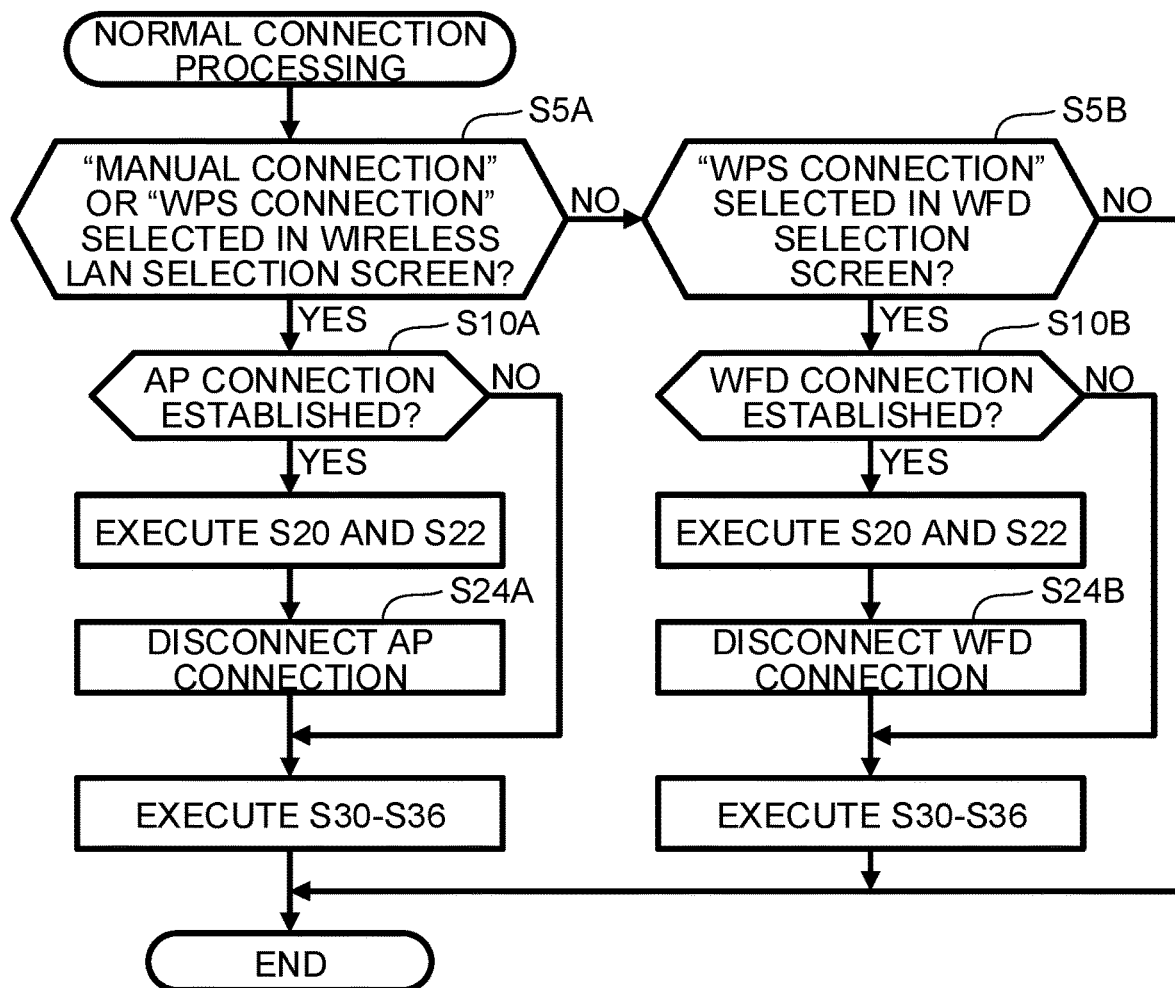

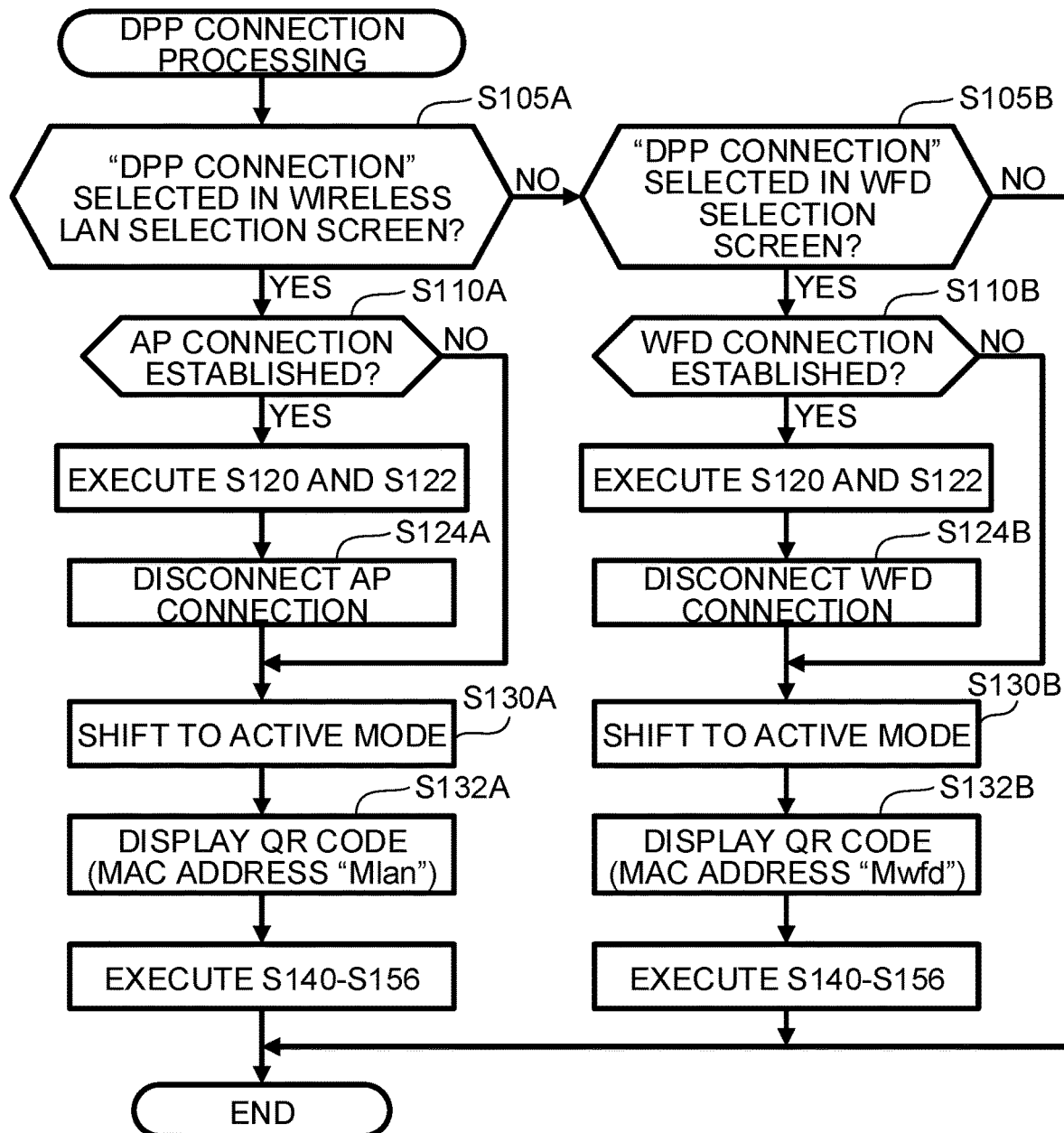

COMMUNICATION DEVICE AND COMPUTER PROGRAMS FOR COMMUNICATION DEVICE ESTABLISHING A WIRELESS CONNECTION WITH AN EXTERNAL DEVICE IN A STATE IN WHICH ANOTHER WIRELESS CONNECTION HAS BEEN ESTABLISHED WITH ANOTHER EXTERNAL DEVICE

CROSS-REFERENCE TO RELATED APPLICATION

This application is a Continuation of U.S. application Ser. No. 17/681,360 filed on Feb. 25, 2022, which application is a Continuation of U.S. application Ser. No. 16/371,453 filed on Apr. 1, 2019, now U.S. Pat. No. 11,265,962 issued on Mar. 1, 2022, which claims priority from Japanese Patent Application No. 2018-068823 filed on Mar. 30, 2018, the content of which are incorporated herein by reference in their entirety.

FIELD OF DISCLOSURE

Aspects described herein relate to a technique for a communication device configured to establish a wireless connection with an external device.

BACKGROUND

A device provisioning protocol ("DPP") is described in, for example, non-patent literature, "DRAFT Device Provisioning Protocol Technical Specification Version 0.2.11" provided by Wi-Fi Alliance. The DPP facilitates establishment of a Wi-Fi connection.

SUMMARY

The non-patent literature does not describe a specific method for establishing a second wireless connection for a communication device (e.g., printer) in accordance with the DPP in a state in which a first wireless connection has been established between the communication device and a first external device. More specifically, the non-patent literature does not describe how a wireless connection is to be established in accordance with the DPP between the communication device and a second external device, which is different from the first external device, in a state in which the wireless connection has been established between the communication device and the first external device. In particular, the DPP non-patent literature does not describe disconnecting the communication device from the first external device prior to connecting to the second external device.

One or more aspects of the disclosure provide a technique of appropriately establishing, in a state in which a first wireless connection has been established between a communication device and a first external device, a second wireless connection between the communication device and a second external device.

One of the aspects of this disclosure includes a communication device (e.g., printer, multifunction peripheral (MFP), etc.) that may comprise a first wireless interface, one or more processors, memory, and an output device configured to output specific information that is obtained using a public key of the communication device. The memory may store instructions that, when executed by the one or more processors, cause the communication device to: after receiving an output instruction for outputting specific information from an output device in a case where a first wireless connection is established between the communication device and a first external device via the first wireless interface, disconnect the first wireless connection, wherein the specific information is obtained using a public key of the communication device; after the public key is obtained by a terminal device, receive, from the terminal device via the first wireless interface, an authentication request generated using the public key; send, to the terminal device via the first wireless interface, an authentication response responsive to the authentication request; after the authentication response is sent to the terminal device, receive, from the terminal device via the first wireless interface, connection information for establishing a second wireless connection between the communication device and a second external device via the first wireless interface, wherein the second external device is different from the first external device; and after the first wireless connection is disconnected and the connection information is received from the terminal device, establish, using the connection information, the second wireless connection between the communication device and the second external device.

According to one or more aspects of the disclosure, subsequent to receiving an instruction for outputting specific information obtained using a public key in a state in which the first wireless connection has been established between the communication device and the first external device, the communication device may disconnect the first wireless connection. This configuration may prevent such a situation that the second wireless connection is not established due to the first wireless connection established. The communication device may receive an authentication request, in which the public key has been used, from the terminal device and may send an authentication response to the terminal device. The communication device may receive the connection information from the terminal device. Subsequent to disconnecting the first wireless connection and receiving the connection information from the terminal device, the communication device may appropriately establish the second wireless connection, using the connection information, between the communication device and the second external device.

Computer programs for implementing the communication device and computer-readable storage media storing the computer programs are novel and have utility. Methods to be executed by the communication device also have novelty and utility. A communication system including the communication device and another device (e.g., the terminal device, the first external device, and/or the second external device) also has novelty and utility.

BRIEF DESCRIPTION OF THE DRAWINGS

FIG. 14 is a flowchart illustrating normal connection processing in the third illustrative embodiment according to one or more aspects of the disclosure.

FIG. 15 is a flowchart illustrating DPP connection processing in the third illustrative embodiment according to one or more aspects of the disclosure.

DETAILED DESCRIPTION

Figure 1:
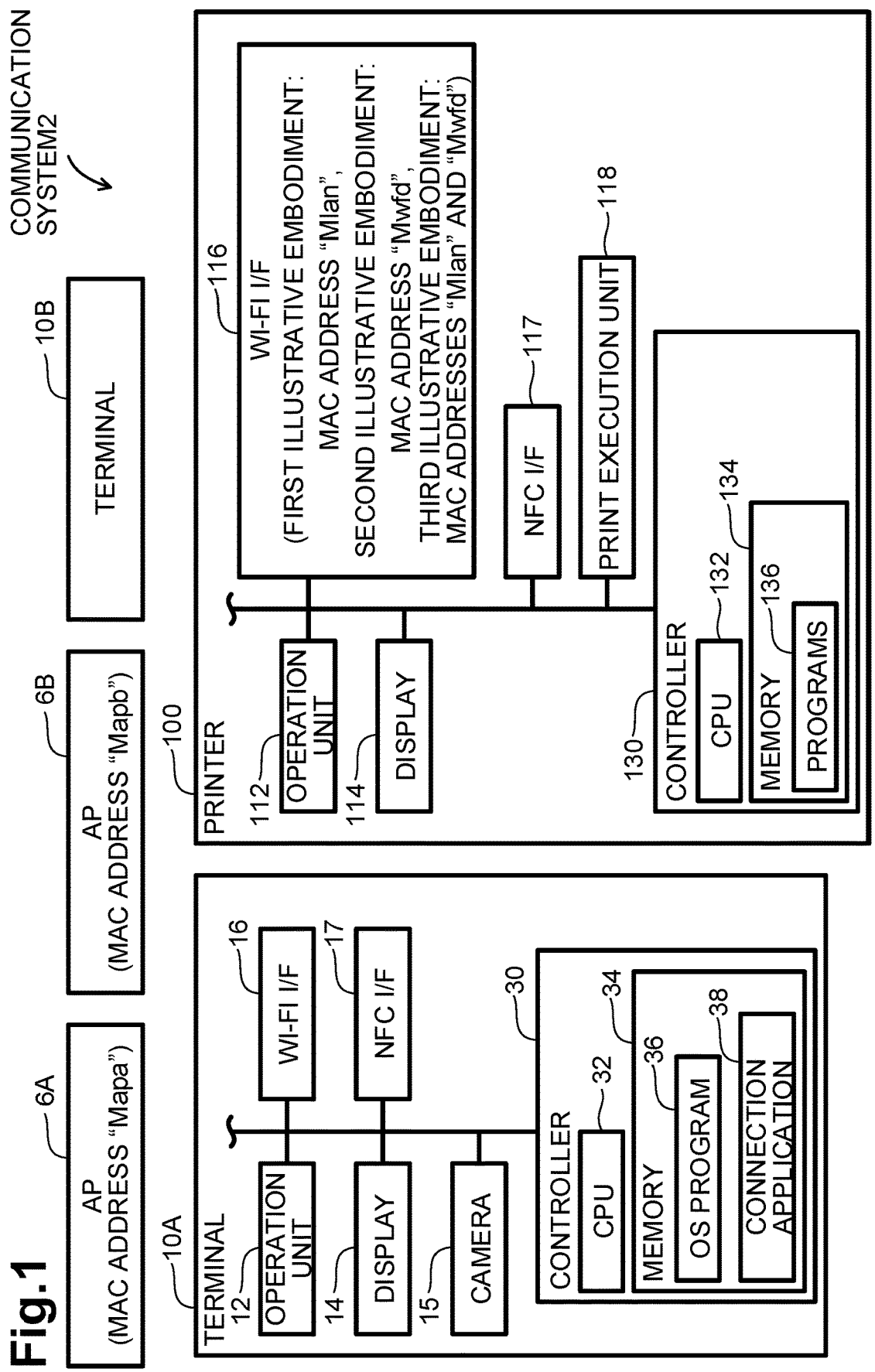
FIG. 1 illustrates a configuration of a communication system including terminals, a printer, and access points (APs), in an illustrative embodiment according to one or more aspects of the disclosure.

First Illustrative Embodiment (Configuration of Communication System 2; FIG. 1)

As depicted in FIG. 1, a communication system 2 includes a plurality of access points ("APs") 6A and 6B, a plurality of terminals 10A and 10B, and a printer 100. In the first illustrative embodiment, a user establishes a wireless connection based on Wi-Fi technology (hereinafter referred to as a "Wi-Fi connection") between the printer 100 and the AP 6A. Thereafter, in place of the wireless connection, the user establishes another Wi-Fi connection between the printer 100 and the AP 6B.

(Configuration of Terminals 10A and 10B)

The terminal 10A has the same or similar configuration to the terminal 10B, so that the terminal 10A will be described in detail below. The terminal 10A may be a portable terminal device, such as a mobile phone (e.g., a smart phone), a PDA, and a tablet PC. In another embodiment, the terminal 10A may be a desktop computer or a laptop computer.

The terminal 10A includes an operation unit 12, a display 14, a camera 15, and a Wi-Fi interface ("I/F") 16, a Near Field Communication ("NFC") interface ("I/F") 17, and a controller 30 that are interconnected via bus lines (no reference number designated).

The operation unit 12 includes a plurality of keys. A user can input a variety of instructions to the terminal 10A by operating the operation unit 12. The display 14 is configured to display a variety of information. The display 14 may include a touch screen display that functions as an operation unit and receives user's instructions. The camera 15 is configured to take photographs of objects. In an illustrative embodiment, the camera 15 may be used for scanning QR codes (registered trademark) provided for the respective APs 6A and 6B and the printer 100.

The Wi-Fi I/F 16 is a wireless communication interface that allows for wireless communication in accordance with Wi-Fi technology as provided in, for example, IEEE (The Institute of Electrical and Electronics Engineers, Inc.) 802.11 standard and other standards (e.g., 802.11a, 11 b, 11g, 11n, and 11 ac). The Wi-Fi I/F 16 supports a device provisioning protocol ("DPP") whose draft specification will be finalized by Wi-Fi Alliance. The draft specification, "DRAFT Device Provisioning Protocol Technical Specification Version 0.2.11" provided by Wi-Fi Alliance, describes DPP that provides a method for readily establishing a Wi-Fi connection, using a terminal (e.g., 10A), between a pair of devices (e.g., the printer 100 and the AP 6A).

The NFC I/F 17 is an interface that allows for wireless communication in accordance with NFC technology (hereinafter, referred to as "NFC communication"). NFC technology is wireless communication technology based on international standards, such as ISO/IEC 14443, 15693, and 18092. Examples of I/Fs for executing an NFC communication may include an NFC Forum Device and an NFC Forum Tag. In the illustrative embodiment, the NFC I/F 17 is an NFC Forum Device.

Significant differences between the Wi-Fi communication and the NFC communication will now be described. The data rate of the Wi-Fi communication (e.g., maximum data rate of 11-600 Mbps) is greater than the data rate of the NFC communication (e.g., maximum data rate of 100-424 Kbps). The frequency of operation in the Wi-Fi communication (e.g., 2.4 GHz or 5.0 GHz) is different from the frequency of operation in the NFC communication (e.g., 13.56 MHz). The maximum coverage/operating range in the Wi-Fi communication (e.g., approximately 100 m) is greater than the maximum coverage/operating range in the NFC communication (e.g., approximately 10 cm).

The controller 30 includes a CPU 32 and memory 34. The CPU 32 is configured to execute various processing based on programs 36 and 38 stored in the memory 34. The memory 34 may be volatile or nonvolatile memory. The memory 34 stores therein an OS program 36, and a connection application 38 (hereinafter simply referred to as the "app 38").

The OS program 36 is a program for controlling principle operations of the terminal 10A. The app 38 is a program for establishing a Wi-Fi connection between a pair of devices in accordance with the DPP. The app 38 may be installed in the terminal 10A from a server on the Internet. The server may be provided by, for example, a vendor of the printer 100.

(Configuration of Printer 100)

The printer 100 is a peripheral device of, for example, the terminal device 10A. The printer 100 is configured to execute printing. The printer 100 includes an operation unit 112, a display 114, a Wi-Fi I/F 116, an NFC I/F 117, a print execution unit 118, and a controller 130 that are interconnected via bus lines (no reference number designated).

The operation unit 112 includes a plurality of keys. A user can input a variety of instructions to the printer 100 by operating the operation unit 112. The display 114 is configured to display a variety of information. The display 114 may include a touch screen display that functions as an operation unit and receives user's instructions. The NFC I/F 117 allows for an NFC communication as the NFC I/F 17 of the terminal 10A does. In the illustrative embodiment, the NFC I/F 117 may be an NFC Forum Device or an NFC Forum Tag. The print execution unit 118 includes, for example, an inkjet or laser printing mechanism.

The Wi-Fi I/F 116 supports the DPP as the Wi-Fi I/F 16 of the terminal 10A does. The Wi-Fi I/F 116 has a media access control ("MAC") address (e.g., "Mlan"). The Wi-Fi I/F 116 allows for a Wi-Fi connection with one AP at one time using the MAC address. In other words, the Wi-Fi I/F 116 does not allow for a plurality of Wi-Fi connections with a plurality of APs simultaneously.

The controller 130 includes a CPU 132 and memory 134. The CPU 132 is configured to execute various processing based on the program(s) 136 stored in the memory 134. The memory 134 may be volatile or nonvolatile memory.

Figure 2:
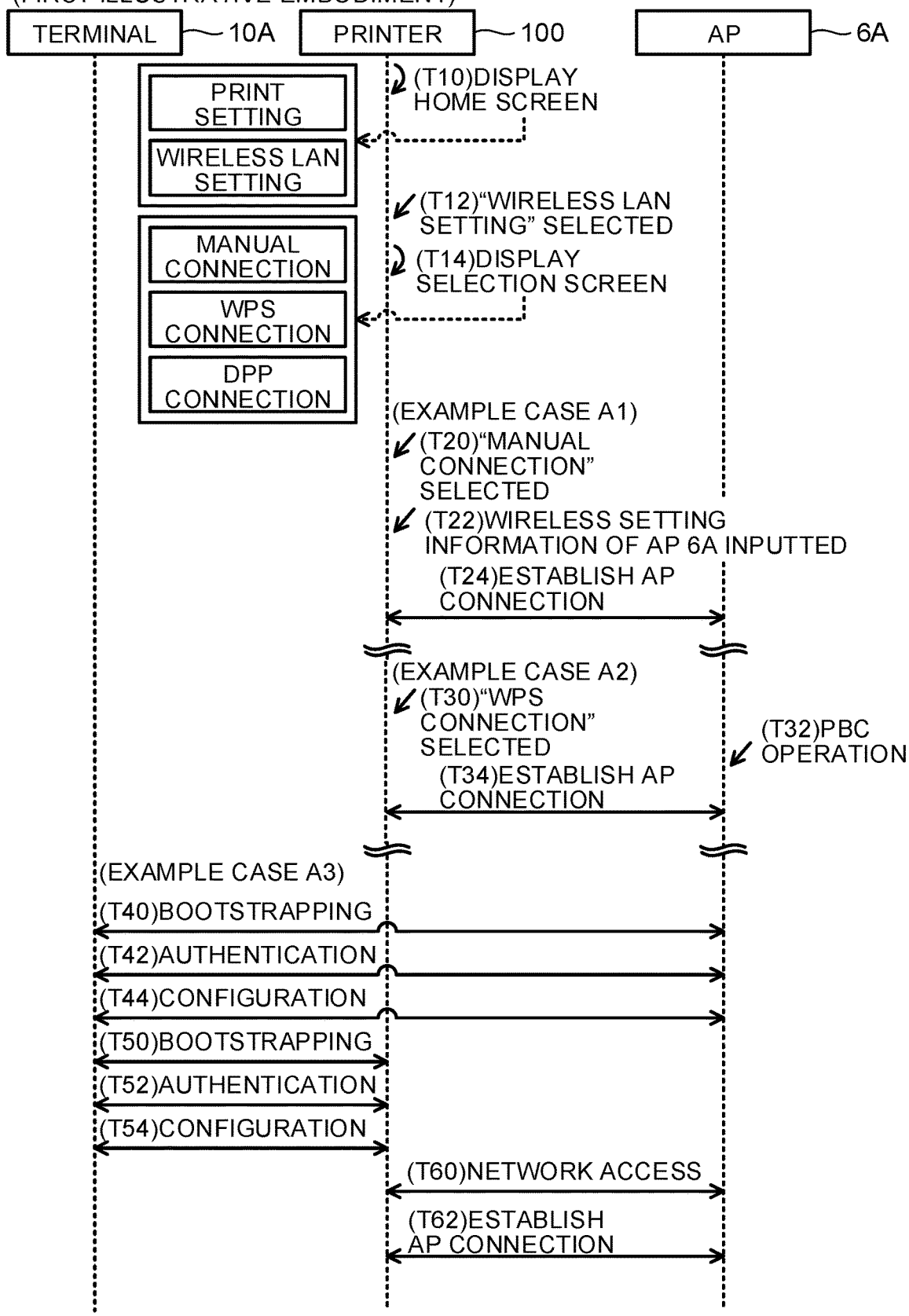
FIG. 2 is a diagram illustrating an outline of a first illustrative embodiment according to one or more aspects of the disclosure.

Outline of First Illustrative Embodiment; FIG. 2

Referring to FIG. 2, an outline of the first illustrative embodiment will now be described. In one example, the APs 6A and 6B and the printer 100 are located within a company. Such a situation may occur in the company, that the printer 100, which joins a first wireless network formed by the AP 6A, is to be connected to a second wireless network formed by the AP 6B (e.g., the wireless network that printer 100 has joined is changed to another wireless network). For example, if the printer 100 on the first wireless network has not been used frequently, an administrator of the communication system 2 may have the printer 100 join the second wireless network, instead of the first wireless network. In the illustrative embodiment, a user (e.g., the administrator) first establishes a Wi-Fi connection between the printer 100 and the AP 6A. Thereafter, in place of the Wi-Fi connection, the user establishes another Wi-Fi connection between the printer 100 and the AP 6B. A Wi-Fi connection between the printer 100 and an AP (e.g., 6A) may be herein referred to as an "AP connection". Referring to in FIG. 2, processing for establishing an AP connection between the printer 100 and the AP 6A will now be described. For ease of understanding, the following disclosure describes the processes/steps as being performed by devices (e.g., the terminal 10A and the printer 100); however, it should be understood that the CPUs 32 and 132 may execute the processes/steps.

Turning the printer 100 on causes the display 114 to display a home screen, at T10. The home screen includes character strings "print setting" and "wireless LAN setting". The LAN stands for Local Area Network.

Based on receiving a user's selection of the "wireless LAN setting" in the home screen at T12, the printer 100 causes the display 114 to display a selection screen at T14. The selection screen includes character strings "manual connection", "WPS (Wi-Fi Protected Setup) connection" and "DPP connection". The "manual connection" is a method for establishing an AP connection based on a user's input of wireless setting information (e.g., a service set identifier ("SSID") and a password) of a wireless network of an AP (e.g., 6A) into the printer 100. The "WPS connection" is a method for establishing an AP connection in accordance with the WPS, based on pressing of a predetermined button on an AP (e.g., based on execution of an operation for Push Button Configuration ("PBC")). The "WPS connection" does not require a user to input the wireless setting information into the printer 100. The "DPP connection" is a method for establishing an AP connection, using a terminal (e.g., 10A), in accordance with the DPP. The "DPP connection" does not require a user to input the wireless setting information into the printer 100.

The "manual connection", the "WPS connection" and the "DPP connection" will be described in conjunction with example cases A1, A2 and A3, respectively.

Example Case A1

In the example case A1, the printer 100 receives a user's selection of the "manual connection" in the selection screen at T20. In this case, the printer 100 receives, at T22, a user input of wireless setting information of the AP 6A. At T24, the printer 100 communicates with the AP 6A using the wireless setting information (e.g., each of the printer 100 and the AP 6A sends various signals to each other), and establishes an AP connection with the AP 6A. The various signals include, for example, a Probe, an Authentication, an Association, and a four-way handshake. The printer 100 joins the wireless network of the AP 6A as a child station device. This may allow the printer 100 to communicate with other child station devices joining the wireless network, via the AP 6A.

Example Case A2

In the example case A2, the printer 100 receives a user's selection of the "WPS connection" in the selection screen at T30. Subsequently, at T32, the user may execute a PBC operation on the AP 6A. In response, at T34, the printer 100 executes communication in accordance with the WPS (e.g., WPS negotiation) with the AP 6A and receives wireless setting information from the AP 6A. The printer 100 communicates with the AP 6A using the wireless setting information (e.g., each of the printer 100 and the AP 6A sends various signals to each other), and establishes an AP connection with the AP 6A. In the illustrative embodiment, the PBC in the WPS is used. In another embodiment, PIN entry in the WPS may be used.

Example Case A3

Each of the terminals 10A and 10B and the printer 100 supports the DPP as described above. Each of the APs 6A and 6B also supports the DPP. In the example case A3, each of the devices 6A, 10A, and 100 executes communication in accordance with the DPP, thereby establishing an AP connection between the printer 100 and the AP 6A.

Subsequent to receiving a user's instruction for starting up the app 38, the terminal 10A executes, at T40, DPP Bootstrapping (hereinafter, simply referred to as the "Bootstrapping") with the AP 6A. The Bootstrapping at T40 is a process for providing information, which is used for a subsequent DPP Authentication (hereinafter, simply referred to as the "Authentication") at T42, from the AP 6A to the terminal 10A. The Bootstrapping may include scanning of a Quick Response (QR) code by the terminal 10A. The QR code may be attached to the AP 6A.

At T42, the terminal 10A executes the DPP Authentication with the AP 6A using the information obtained in the Bootstrapping at T40. The Authentication process at T42 is a process for authenticating the terminal 10A and the AP 6A to each other.

At T44, the terminal 10A executes a DPP Configuration process with the AP 6A. The Configuration process is a process for sending, from the terminal 10A to the AP 6A, information (e.g., a configuration object ("CO")) for establishing an AP connection. In one example, the terminal 10A generates a CO for the AP 6A. The CO for the AP 6A may be herein referred to as an "AP 6A configuration object". The terminal 10A sends the AP 6A configuration object to the AP 6A. The AP 6A receives and stores the AP 6A configuration object therein.

Subsequently, at T50, the terminal 10A executes DPP Bootstrapping with the printer 100. The Bootstrapping at T50 is a process for providing information, which is used for a subsequent DPP Authentication process at T52, from the printer 100 to the terminal 10A. The Bootstrapping at T50 will be described in conjunction with the following two example cases A3-1 and A3-2.

Example Case A3-1

Figure 3:
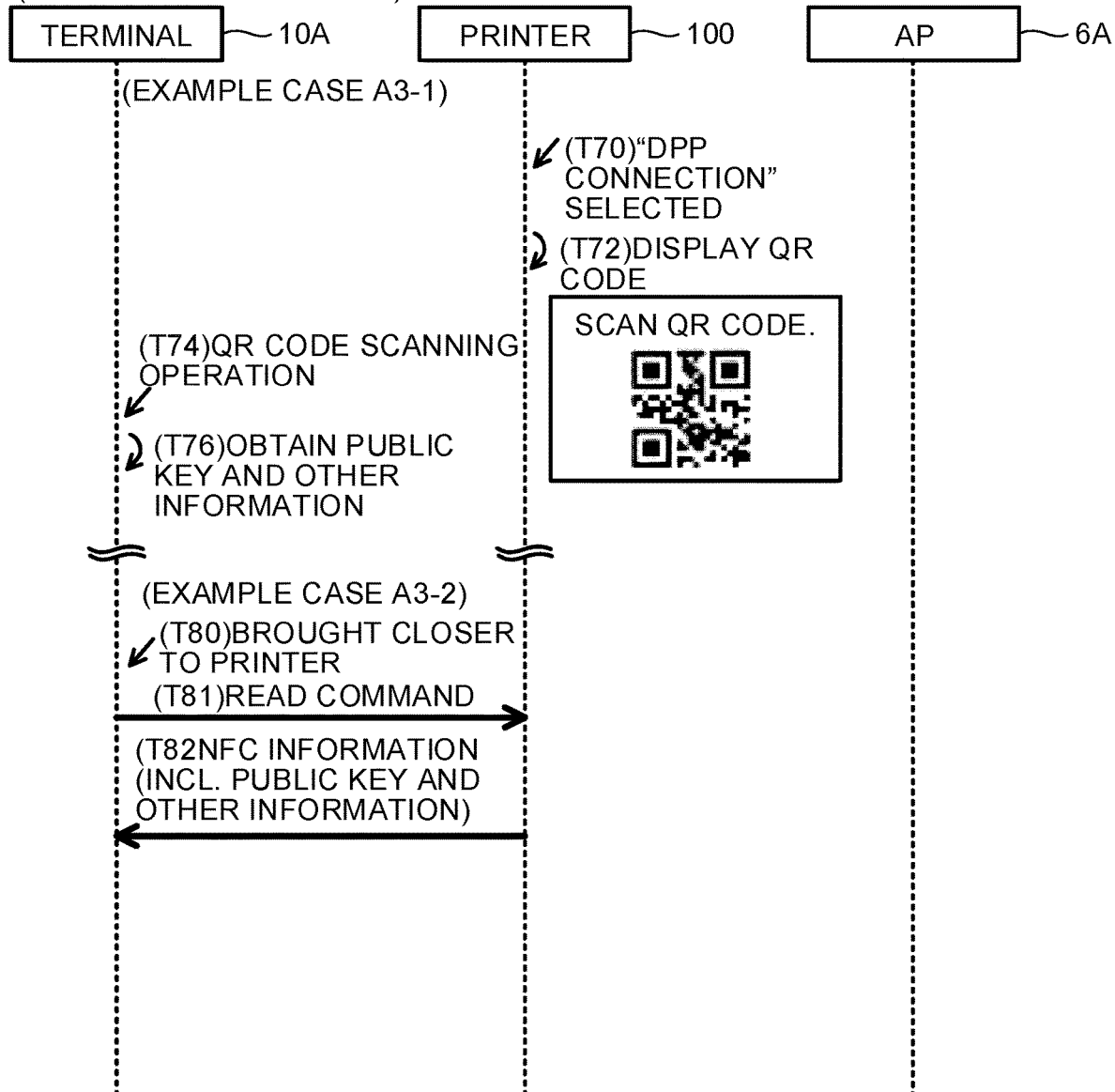
FIG. 3 is a sequence diagram illustrating Bootstrapping in an illustrative embodiment according to one or more aspects of the disclosure.

In the example case A3-1 as depicted in FIG. 3, the printer 100 receives, at T70, a user's selection of the "DPP connection" in the selection screen. At T72, the printer 100 causes the display 114 to display a QR code of the printer 100. The QR code is a coded image that is obtained by encoding information, such as a public key of the printer 100. The public key of the printer 100 may be pre-stored (e.g., by a printer manufacturer) in the memory 134. The QR code may be generated by the printer 100 at the time of execution of T72, or may be stored in the memory 134 before the printer 100 is shipped.

Based on a user's operation of the terminal 10A for scanning the QR code at T74, the terminal 10A causes the camera 115 to scan the QR code. At T76, the terminal 10A decodes the scanned QR code and obtains information, such as the public key of the printer 100.

Example Case A3-2

In the example case A3-2, at T80, the terminal 10A is brought closer to the printer 100 (e.g., the NFC I/F 17 of the terminal 10A is brought closer to the NFC I/F 117 of the printer 100). A distance between the NFC I/Fs 17 and 117 may be reduced to, for example, 10 cm or less, which enables an NFC communication. Thus, an NFC connection is established between the NFC I/Fs 17 and 117.

The NFC I/F 117 pre-stores NFC information including information such as a public key of the printer 100. At T81, the NFC I/F 117 receives, using the NFC connection, a Read command from the terminal 10A. At T82, the NFC I/F 117 sends the NFC information to the terminal 10A.

Based on receiving the NFC information from the printer 100 via the NFC I/F 17 at T82, the terminal 10A obtains the information, such as the public key of the printer 100, included in the NFC information.

Example Case A3 (Contd.)

Referring back to FIG. 2, at T52, the terminal 10A executes the Authentication process with the printer 100 using the information obtained in the Bootstrapping at T50. The Authentication at T52 is a process for authenticating the terminal 10A and the printer 100 to each other.

At T54, the terminal 10A executes DPP Configuration with the printer 100. The Configuration process at T54 is a process for sending, from the terminal 10A to the printer 100, information for establishing an AP connection. In one example, the terminal 10A generates a CO for the printer 100 (printer configuration object) for establishing an AP connection. The terminal 10A sends the printer configuration object to the printer 100. The printer 100 receives and stores the printer configuration object therein.

At T60, the printer 100 and the AP 6A execute DPP Network Access using the printer configuration object and the AP 6A configuration object. The Network Access at T60 is a process for sharing, between the printer 100 and the AP 6A, a connector key for establishing an AP connection therebetween.

At T62, the printer 100 and the AP 6A execute a four-way handshake, thereby establishing an AP connection therebetween. During the four-way handshake, each of the printer 100 and the AP 6A sends information encrypted using the connector key shared in the Network Access at T60. If decryption of the encrypted information is successful, an AP connection is established between the printer 100 and the AP 6A. In another embodiment, the printer 100 and the AP 6A may execute simultaneous authentication of equals ("SAE" or what is called "Dragonfly") instead of the four-way handshake.

In any of the example cases A1-A3, as the printer 100 establishes an AP connection with the AP 6A, the printer 100 stores, in the memory 134, wireless information used for establishing the AP connection. In one example, the wireless information may be the wireless setting information (e.g., a SSID and a password) in the example cases A1 and A2, and may be the printer configuration object and the connector key in the example case A3.

Figure 4:
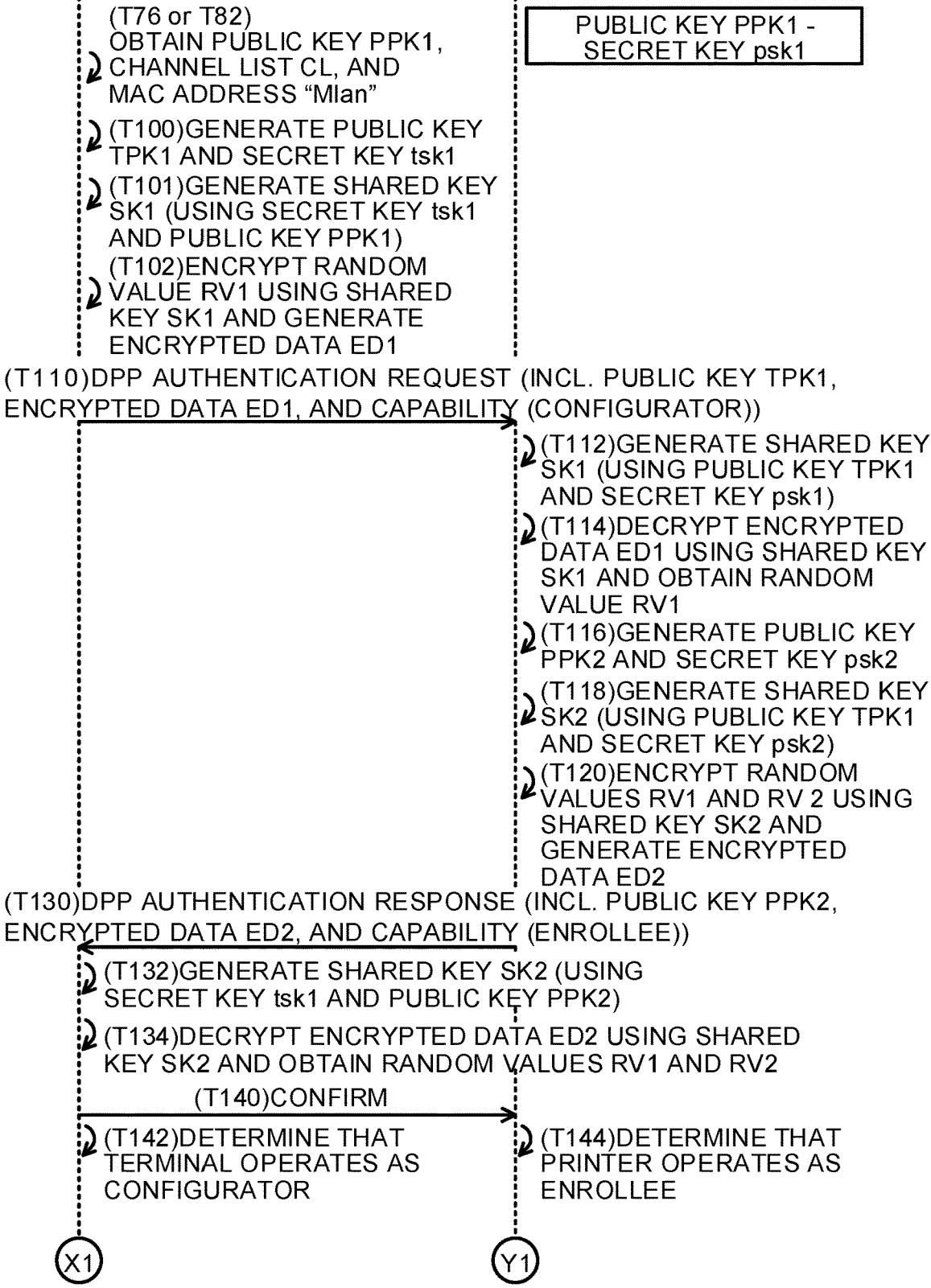
FIG. 4 is a sequence diagram illustrating Authentication in an illustrative embodiment according to one or more aspects of the disclosure.
Figure 5:
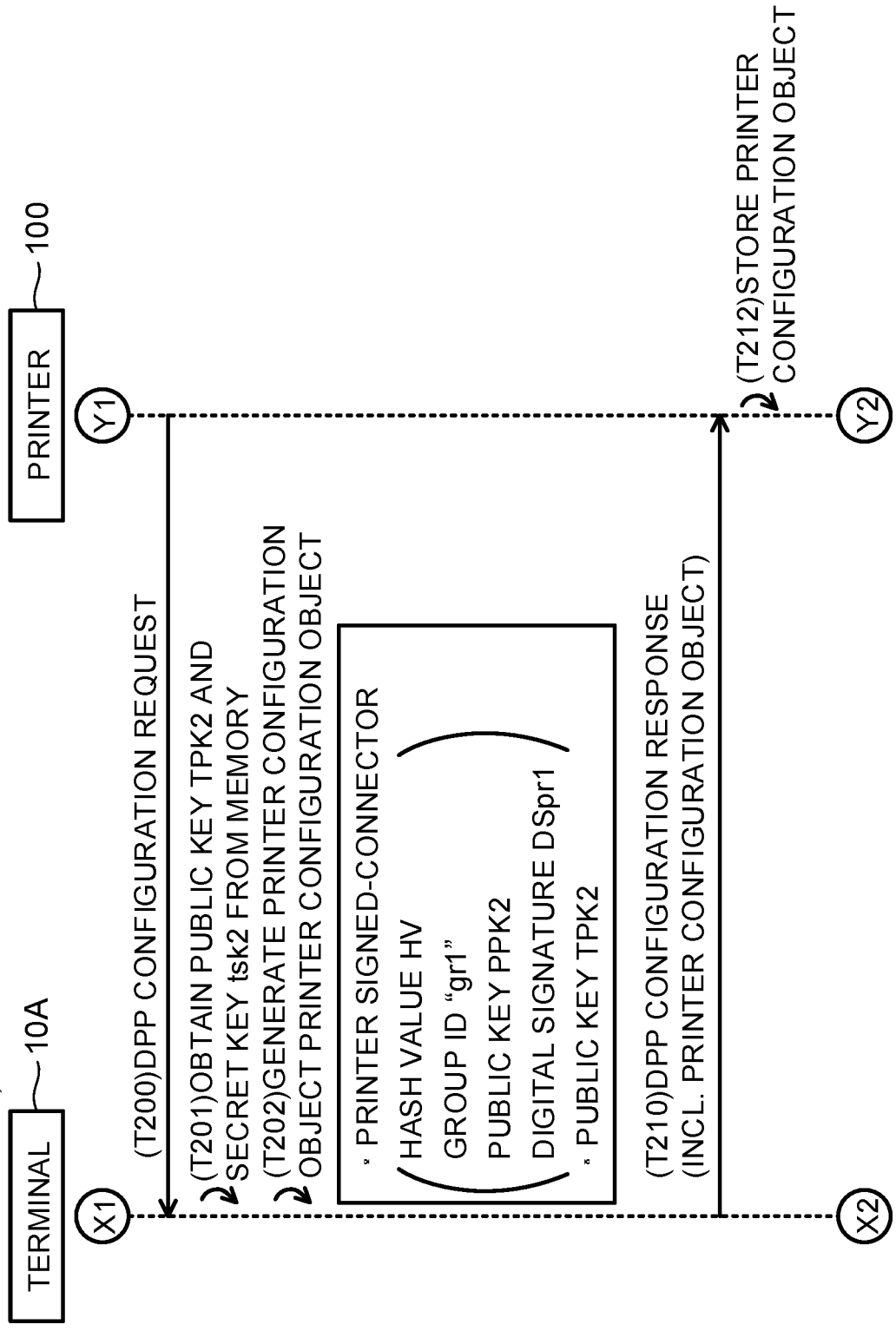
FIG. 5 is a sequence diagram illustrating Configuration in an illustrative embodiment according to one or more aspects of the disclosure.
Figure 6:
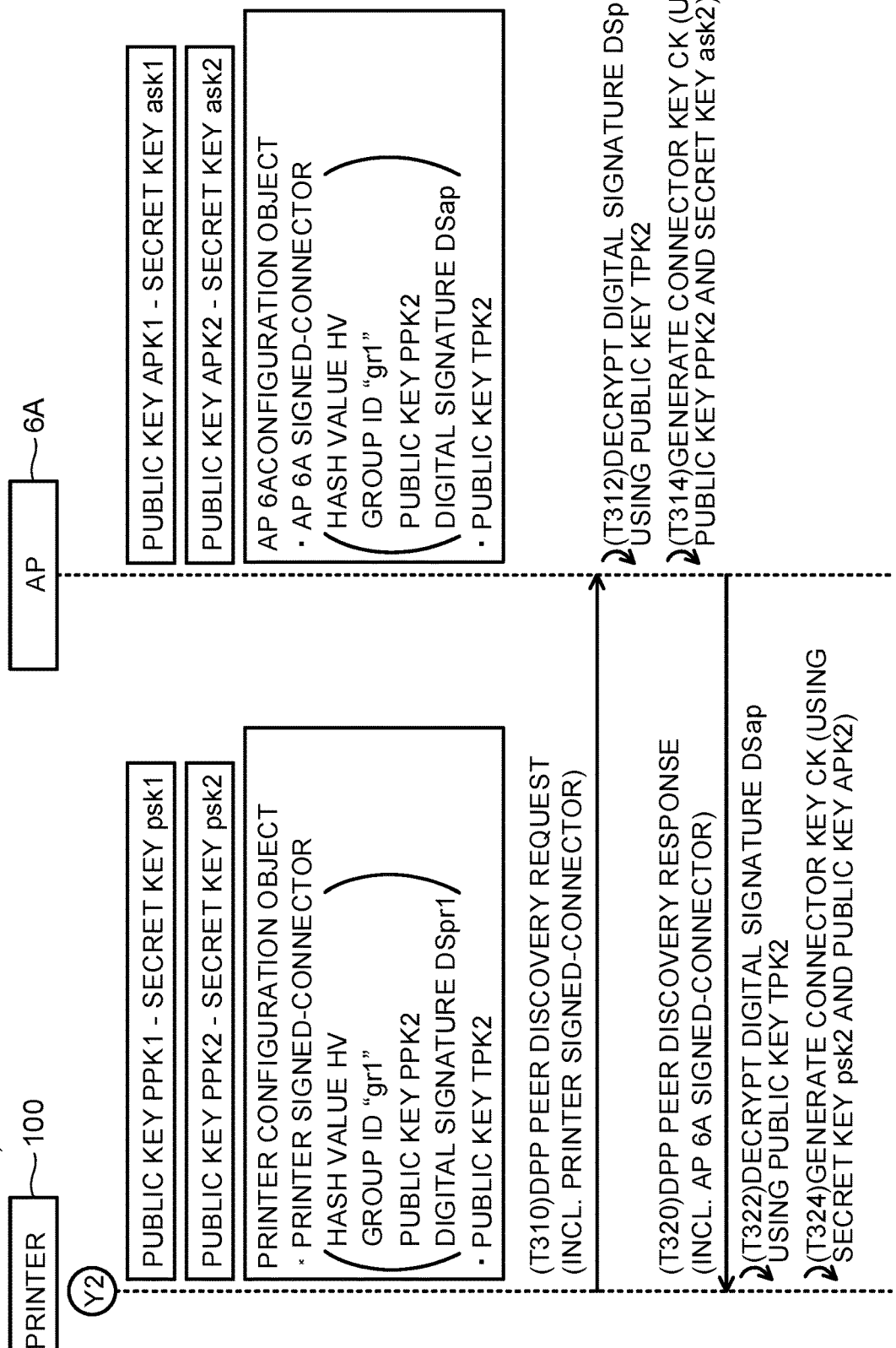
FIG. 6 is a sequence diagram illustrating Network Access in an illustrative embodiment according to one or more aspects of the disclosure.

(Authentication, Configuration, and Network Access; FIGS. 4-6)

Next, referring to FIGS. 4-6, the Authentication, Configuration, and Network Access at T52-T60 in FIG. 2 will now be described in detail below. Steps T42 and T44 are similar to T52 and T54, except that the terminal 10A executes processes with the AP 6A at T42 and T44, instead of the printer 100, so further description of T42 and T44 will be omitted herein.

(Authentication; FIG. 4)

Referring to in FIG. 4, the Authentication at T52 in FIG. 2 will now be described. As described above in conjunction with the Bootstrapping at T50 in FIG. 2, the terminal 10A obtains information, such as the public key of the printer 100, from the printer 100 (at T76 or T82 in FIG. 3). The information, which the terminal 10A obtains from the printer 100, will now be described in detail. The memory 134 of the printer 100 pre-stores a public key PPK1 and a private key psk1 of the printer 100, a channel list CL, and the MAC address (e.g., "Mlan") of the Wi-Fi I/F 116. The channel list CL lists a plurality of communication channels to be used for the Authentication. In other words, the channel list CL lists communication channels usable by the printer 100.

The QR code that is displayed at T72 in FIG. 3 is obtained by encoding the public key PPK1, the channel list CL, and the MAC address "Mlan". The terminal 10A can obtain those pieces of information at T76 by decoding the QR code. The NFC I/F 117 of the printer 100 pre-stores the NFC information including the public key PPK1, the channel list CL, and the MAC address "Mlan". At T82 in FIG. 3, the NFC I/F 117 of the printer 100 sends the NFC information to the terminal 10A. The terminal 10A receives the NFC information and obtains those pieces of information included in the NFC information at T82.

Based on executing T76 or T82 in FIG. 3, the terminal 10A generates a public key TPK1 and a private key tsk1 thereof, at T100 in FIG. 4. Subsequently, the terminal 10A generates a shared key SK1 at T101, using the generated private key tsk1 of the terminal 10A, and the public key PPK1 of the printer 100 obtained at T76 or T82 in FIG. 3. The shared key SK1 may be generated based on Elliptic Curve Diffie-Hellman key exchange ("ECDH"). At T102, the terminal 10A encrypts a random value RV1 using the shared key SK1, and generates encrypted data ED1.

At T110, the terminal 10A sends, via the Wi-Fi I/F 16, a DPP Authentication Request (hereinafter referred to as an "AReq") to the printer 100, e.g., the MAC address "Mlan" obtained at T76 or T82 in FIG. 3, as a recipient. The AReq is a signal for requesting the printer 100 to execute an authentication process. The terminal 10A may send the AReq to the printer 100 one or more times using (e.g., sequentially) one or more communication channels listed or represented in the channel list CL, which is obtained at T76 or T82 in FIG. 3. The AReq includes the public key TPK1 of the terminal 10A, which is generated at T100, the encrypted data ED1, which is generated at T102, and capability information of the terminal 10A.

The capability information is information that is pre-designated for a DPP-supporting device. The capability includes one of three values: a value representing the device operates as a DPP Configurator; a value representing the device operates as a DPP Enrollee; and a value representing the device operates as both the Configurator and the Enrollee. The Configurator refers to a device that sends, in the Configuration process (at T54 in FIG. 2), a configuration object for use in the Network Access (at T60 in FIG. 2), to an Enrollee. The Enrollee refers to a device that receives, in the Configuration, a configuration object for use in the Network Access, from the Configurator. In the illustrative embodiment, the terminal 10A generates the AP 6A configuration object and sends the AP 6A configuration object to the AP 6A, and also generates the printer configuration object and sends the printer configuration object to the printer 100, as described above. The capability information of the terminal 10A includes a value representing that the terminal 10A operates as a Configurator.

At T110, the printer 100 receives the AReq from the terminal 10A, via the Wi-Fi I/F 116. As described above, the AReq is sent to the MAC address (e.g., "Mlan") of the printer 100, as a recipient, so that the printer 100 may receive the AReq from the terminal 10A appropriately.

The printer 100 monitors reception of the AReq that is sent using one of the communication channels listed or represented in the channel list CL. As described above, the AReq is sent using (e.g., sequentially) one or more of the communication channels listed or represented in the channel list CL, so that the printer 100 may receive the AReq from the terminal 10A appropriately.

Subsequently, the printer 100 executes the following steps for authenticating the sender (e.g., the terminal 10A) of the AReq. In one example, at T112, the printer 100 generates a shared key SK1, based on the ECDH, using the public key TPK1 of the terminal 10A in the AReq and the private key psk1 of the printer 100 in the memory 134. The shared key SK1 generated by the printer 100 at T112 is the same as the shared key SK1 generated by the terminal 10A at T101. At T114, the printer 100 successfully decrypts the encrypted data ED1 in the AReq using the shared key SK1, and obtains the random value RV1. If the decryption of the encrypted data ED1 is successful, the printer 100 determines that the sender of the AReq is a device that has obtained the public key PPK1 of the printer 100, e.g., determines that the authentication is successful. Subsequently, the printer 100 executes T116 and its subsequent steps. If the decryption of the encrypted data ED1 is not successful, the printer 100 determines that the sender of the AReq is not a device that has obtained the public key PPK1 of the printer 100, e.g., determines that the authentication is not successful, and does not execute T116 or its subsequent steps.

At T116, the printer 100 generates a public key PPK2 and a private key psk2 thereof. In another embodiment, the printer 100 may pre-store the public key PPK2 and the private key psk2 in the memory 134. Subsequently, at T118 the printer 100 generates a shared key SK2, based on the ECDH, using the public key TPK1 of the terminal 10A in the AReq at T110 and the generated private key psk2 of the printer 100. At T120, the printer 100 encrypts the random value RV1 and a random value RV2 using the shared key SK2, and generates encrypted data ED2.

At T130, the printer 100 sends a DPP Authentication Response (hereinafter referred to as an "ARes") to the terminal 10A, via the Wi-Fi I/F 116. The ARes includes the public key PPK2 of the printer 100, which is generated at T116, the encrypted data ED2, which is generated at T120, and a capability of the printer 100. The capability includes a value representing that the printer 100 operates as an Enrollee.

Based on receiving the ARes from the printer 100 via the Wi-Fi I/F 16 at T130, the terminal 10A executes the following steps for authenticating the sender (e.g., the printer 100) of the ARes. In one example, at T132, the terminal 10A generates a shared key SK2, based on the ECDH, using the private key tsk1 of the terminal 10A generated at T100, and the public key PPK2 of the printer 100 in the ARes. The shared key SK2 generated by the terminal 10A at T132 is the same as the shared key SK2 generated by the printer 100 at T118. At T134, the terminal 10A successfully decrypts the encrypted data ED2 in the ARes using the shared key SK2, and obtains the random values RV1 and RV2. If the decryption of the encrypted data ED2 is successful, the terminal 10A determines that the sender of the ARes is a device that provides the public key PPK1 that the terminal 10A has obtained, e.g., determines that the authentication is successful. Subsequently, the terminal 10A executes T140 and its subsequent steps. If the decryption of the encrypted data ED2 is not successful, the terminal 10A determines that the sender of the ARes is not a device that provides the public key PPK1 that the terminal 10A has obtained, e.g., determines that the authentication is not successful, and does not execute T140 or its subsequent steps.

At T140, the terminal 10A sends a Confirm message to the printer 100, via the Wi-Fi I/F 16. The Confirm message includes information representing that the terminal 10A operates as a Configurator and the printer 100 operates as an Enrollee, so that the terminal 10A determines, at T142, that the terminal 10A operates as a Configurator, and the printer 100 determines, at T144, that the printer 100 operates as an Enrollee. This ends the Authentication in FIG. 4.

(Configuration; FIG. 5)

Referring to in FIG. 5, the Configuration, at T54 in FIG. 2, will now be described. At T200, the printer 100 sends a DPP Configuration Request (hereinafter referred to as a "CReq") to the terminal 10A, via the Wi-Fi I/F 116. The CReq is a signal for requesting the terminal 10A to send the printer configuration object.

At T200, the terminal 10A receives the CReq from the printer 100, via the Wi-Fi I/F 16. Based on receiving the CReq from the printer 100, the terminal 10A obtains, at T201, from the memory 34, a public key TPK2 and a private key tsk2 thereof, and a group ID (e.g., "gr1"). As described above, at T44 in FIG. 2, the terminal 10A has executed, with the AP 6A, the Configuration in which the terminal 10A generates the public key TPK2 and the private key tsk2 and stores the keys TPK2 and tsk2 in the memory 34. At T201, the terminal 10A obtains the information (e.g., keys TPK2 and tsk2, and the group ID) stored at T44 in FIG. 2. The group ID (e.g., "gr1") is information for identifying the wireless network formed as an AP connection is established between the printer 100 and the AP 6A.

Subsequently, the terminal 10A generates, at T202, a printer configuration object. In one example, the terminal 10A performs a hash function of the public key TPK2 of the terminal 10A obtained at T201, and generates a hash value HV. The terminal 10A also performs a hash function of a combination of the hash value HV, the group ID (e.g., "gr1"), and the public key PPK2 of the printer 100 in the ARes at T130 in FIG. 4, and generates a particular value. The terminal 10A encrypts the particular value using the private key tsk2 of the terminal 10A obtained at T201, based on an Elliptic Curve Digital Signature Algorithm ("ECDSA"), and generates a digital signature DSpr1. The terminal 10A generates a signed-connector ("SC") for the printer 100. The SC for the printer 100 may be herein referred to as a "printer signed-connector". The printer signed-connector includes the hash value HV, the group ID (e.g., "gr1"), the public key PPK2 of the printer 100, and the digital signature DSpr1. Subsequently, the terminal 10A generates a printer configuration object including the printer signed-connector and the public key TPK2 of the terminal 10A.

At T210, the terminal 10A sends, via the Wi-Fi I/F 16, a DPP Configuration Response (hereinafter referred to as a "CRes") to the printer 100. The CRes includes the printer configuration object.

At T210, the printer 100 receives the CRes from the terminal 10A, via the Wi-Fi I/F 116. Based on receiving the CRes from the terminal 10A, the printer 100 stores, at T212, the printer configuration object in CRes, in the memory 134. This ends the Configuration in FIG. 5.

(Network Access; FIG. 6)

Referring to FIG. 6, the Network Access, at T60 in FIG. 2, between the printer 100 and the AP 6A, will now be described. The AP 6A pre-stores therein a public key APK1 and a private key ask1 of the AP 6A. The AP 6 have a QR code attached to a casing thereof. The QR code is obtained by encoding the public key APK1 of the AP 6A, a channel list of the AP 6A, and a MAC address (e.g., "Mapa") of the AP 6A. The terminal 10A scans the QR code of the AP 6A at T40 in FIG. 2. Subsequently, processes similar to T101 in FIGS. 4 to T212 in FIG. 5 are executed between the terminal 10A and the AP 6A. The AP 6A generates a public key APK2 and a private key ask2 thereof (refer to T116 in FIG. 4). The AP 6A stores therein those keys APK2 and ask2, as well as the AP 6A configuration object received from the terminal 10A (refer to T212 in FIG. 5). The AP 6A configuration object includes an AP 6A signed-connector, and the public key TPK2 of the terminal 10A. The public key TPK2 included in the AP 6A signed-connector is the same as the public key TPK2 included in the printer configuration object. The AP 6A signed-connector includes the hash value HV, the group ID (e.g., "gr1"), the public key APK2 of the AP 6A, and a digital signature DSap. The hash value HV and the group ID (e.g., "gr1") in the AP 6A configuration object are the same as the hash value HV and the group ID (e.g., "gr1") in the printer configuration object. The digital signature DSap is information including a particular value that is encrypted with the private key tsk2 of the terminal 10A. The particular value is obtained by performing a hash function of a combination of the hash value HV, the group ID (e.g., "gr1"), and the public key APK2. The digital signature DSap is different from the digital signature DSpr1 included in the printer configuration object.

At T310, the printer 100 sends, via the Wi-Fi I/F 116, a DPP Peer Discovery Request (hereinafter referred to as a "DReq") including the printer signed-connector, to the AP 6A. The DReq is a signal for requesting the AP 6A to execute an authentication process and to send the AP 6A signed-connector to the printer 100.

Based on receiving the DReq from the printer 100 at T310, the AP 6A executes the authentication process for authenticating the sender (e.g., the printer 100) of the DReq, and information in the DReq (e.g., the hash value HV, the group ID (e.g., "gr1"), and the public key PPK2). The authentication process may include a first AP determination process and a second AP determination process, which are described below. In one example, the AP 6A executes the first AP determination process. In this process, the AP 6A determines whether the hash value HV and the group ID (e.g., "gr1") in the printer signed-connector respectively match the hash value HV and the group ID (e.g., "gr1") in the AP 6A signed-connector included in the AP 6A configuration object. In the example case shown in FIG. 6, the AP 6A determines "yes" in the first AP determination process (e.g., determines that the hash value HV and the group ID "gr1" in the printer signed-connector respectively match the hash value HV and the group ID "gr1" in the AP 6A signed-connector). In other words, the AP 6A determines that authentication of the sender (e.g., the printer 100) of DReq is successful. Determining that the hash value HV in the printer signed-connector matches the hash value HV in the AP 6A signed-connector means that the printer signed-connector and the AP 6A signed-connector are both generated by the same device (e.g., the terminal 10A). Accordingly, the AP 6A also determines that authentication of the generator (e.g., the terminal 10A) of the printer signed-connector is successful. At T312, the AP 6A decrypts the digital signature DSpr1 in the printer signed-connector, using the public key TPK2 of the terminal 10A included in the AP 6A configuration object. In the example case shown in FIG. 6, the digital signature DSpr1 is successfully decrypted. Subsequently, the AP 6A executes the second AP determination process. In this process, the AP 6A determines whether the particular value obtained by decrypting the digital signature DSpr1 matches the value obtained by performing a hash function of information in the printer signed-connector (e.g., the hash value HV, the group ID "gr1", and the public key PPK2). In the example case shown in FIG. 6, the AP 6A determines "yes" in the second AP determination process (e.g., determines that the particular value matches the value obtained by performing a hash function of information in the printer signed-connector). In other words, the AP 6A determines that authentication of the information in the DReq is successful, and executes T314 and its subsequent steps. Determining "yes" in the second AP determination process means that information in the printer signed-connector (e.g., the hash value HV, the group ID "gr1", and the public key PPK2) has not been altered or modified by someone since the printer configuration object was stored in the printer 100. In a case where the AP 6A determines "no" in the first AP determination process; the decryption of the digital signature DSpr1 is unsuccessful; or the AP 6A determines "no" in the second AP determination process, the AP 6A determines that authentication of the DReq is unsuccessful and does not execute T314 or its subsequent steps.

Subsequently, the AP 6A generates a connector key (e.g., shared key) CK at T314, based on the ECDH, using the public key PPK2 of the printer 100 in the printer signed-connector and the private key ask2 of the AP 6A.

At T320, the AP 6A sends a DPP Peer Discovery Response ("DRes") including the AP signed-connector, to the printer 100.

Based on receiving the DRes from the AP 6A via the Wi-Fi I/F 116 at T320, the printer 100 executes an authentication process for authenticating the sender (e.g., the AP 6A) of the DRes, and information in the DRes (e.g., the hash value HV, the group ID "gr1", and the public key APK2). The authentication process may include a first printer determination process and a second printer determination process, which are described below. In one example, the printer 100 executes the first printer determination process. In this process, the printer 100 determines whether the hash value HV and the group ID "gr1" in the AP 6A signed-connector respectively match the hash value HV and the group ID "gr1" in the printer signed-connector included in the printer configuration object. In the example case of FIG. 6, the printer 100 determines "yes" in the first printer determination process (e.g., determines that the hash value HV and the group ID "gr1" in the AP 6A signed-connector respectively match the hash value HV and the group ID "gr1" in the printer signed-connector). In other words, the printer 100 determines that authentication of the sender (e.g., the AP 6A) of the DRes, as well as the generator (e.g., the terminal 10A) of the AP 6A signed-connector, is successful. At T322, the printer 100 decrypts the digital signature DSap in the AP 6A signed-connector, using the public key TPK2 of the terminal 10A included in the printer configuration object. In the example case of FIG. 6, the digital signature DSap is successfully decrypted. Subsequently, the printer 100 executes the second printer determination process. In this process, the printer 100 determines whether the particular value obtained by decrypting the digital signature DSap matches the value obtained by performing a hash function of information in the AP 6A signed-connector (e.g., the hash value HV, the group ID "gr1", and the public key APK2). In the example case of FIG. 6, the printer 100 determines "yes" in the second printer determination process (e.g., the particular value matches the value obtained by performing a hash function of information in the AP 6A signed-connector). In other words, the printer 100 determines that authentication of the information in the DRes is successful, and executes T324 and its subsequent steps. Determining "yes" in the second printer determination process means that information in the AP 6A signed-connector has not been altered or modified by someone since the AP 6A configuration object was stored in the AP 6A. In a case where the printer 100 determines "no" in the first printer determination process; the decryption of the digital signature DSap is unsuccessful; or the printer 100 determines "no" in the second printer determination process, the printer 100 determines that authentication of the DRes is unsuccessful and does not execute T324 or subsequent steps.

At T324, the printer 100 generates a connector key (e.g., shared key) CK, based on the ECDH, using the private key psk2 of the printer 100 and the public key APK2 of the AP 6A in AP 6A signed-connector. The connector key CK generated by the printer 100 at T324 is the same as the connector key CK generated by the AP 6A at T314. The connector key CK is thus shared between the printer 100 and the AP 6A to establish an AP connection therebetween. Upon completion of T324, the Network Access in FIG. 6 ends.

As described above, the connector key CK is shared between the printer 100 and the AP 6A. Subsequently, the printer 100 and the AP 6A execute, at T62 in FIG. 2, a four-way handshake using the connector key CK, and an AP connection is established between the printer 100 and the AP 6A. In other words, the printer 100 joins, as a child station device, a wireless network in which the AP 6A acts as a parent station device. The printer 100 can communicate, via the AP 6A, with other child station devices that join the wireless network.

Figure 7:
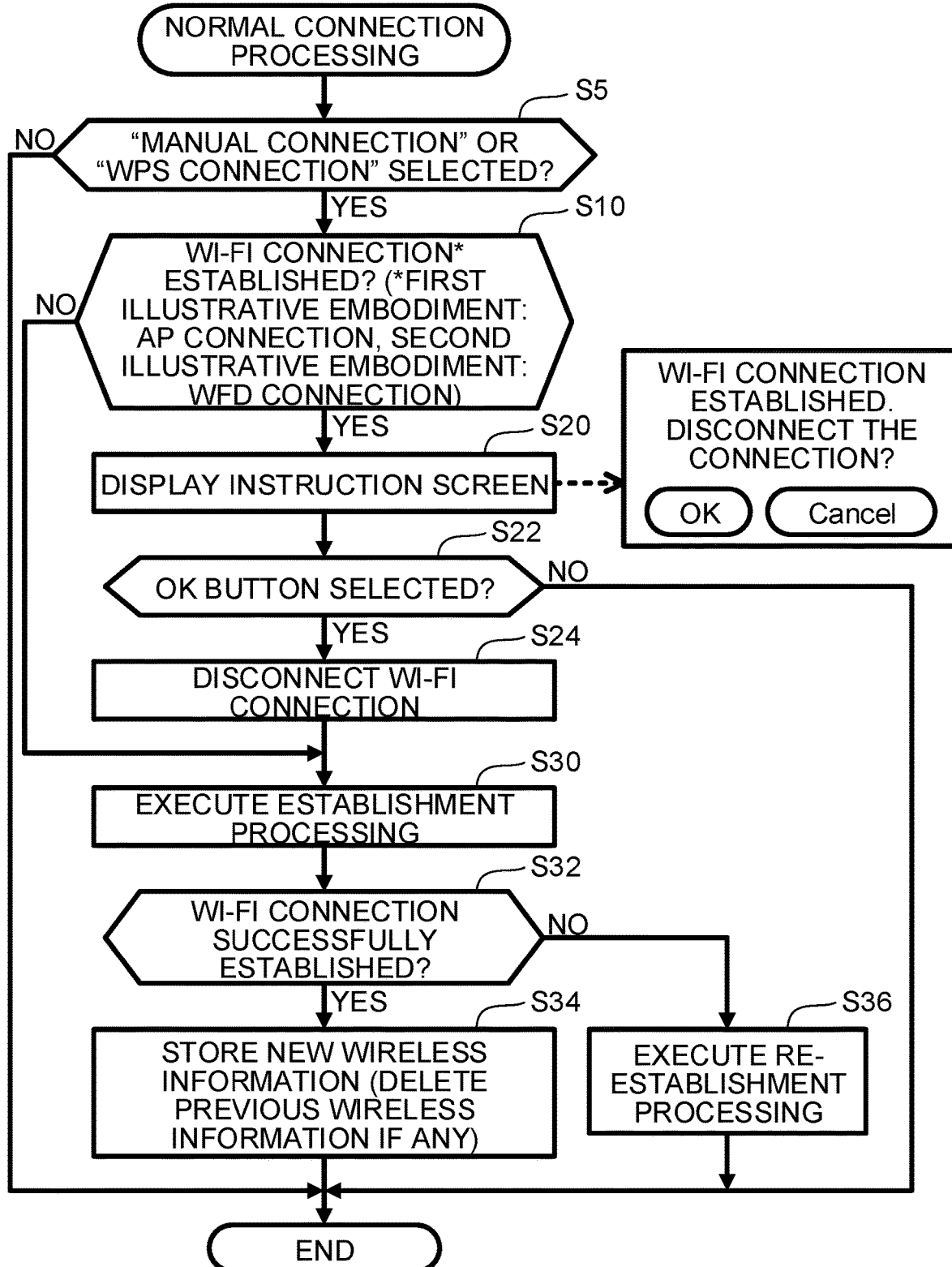
FIG. 7 is a flowchart illustrating normal connection processing in the first illustrative embodiment and a second illustrative embodiment according to one or more aspect of the disclosure.

(Normal Connection Processing; FIG. 7)

Referring to in FIG. 7, normal connection processing that the CPU 132 of the printer 100 executes in accordance with the program(s) 136, will now be described. Turning the printer 100 on causes the normal connection processing to start. The normal connection processing may be repeatedly executed while the printer 100 is turned on. In the following description, an AP with which the printer 100 is intended to establish an AP connection, may be referred to as a "target AP".

At S5, the CPU 132 monitors user's selection of the "manual connection" or the "WPS connection" in the selection screen as displayed at T14 in FIG. 2. If the "manual connection" or the "WPS connection" is selected (refer to T20 or T30 in FIG. 2), the CPU 132 determines "YES" at S5 and proceeds to S10. If the CPU 132 determines "NO" at S5, the CPU 132 ends the normal connection processing in FIG. 7.

At S10, the CPU 132 determines whether an AP connection is established at present. In one example, if the CPU 132 determines that an AP connection has been established with a particular AP (e.g., wireless information has been stored in the memory 134) using any one of the methods as described in conjunction with the example cases A1-A3 in FIG. 2 and the AP connection is not disconnected, the CPU 132 determines "YES" at S10 and proceeds to S20. If the CPU 132 determines that an AP connection has never been established (e.g., no wireless information has stored in the memory 134), or an AP connection, which has been established, is disconnected, the CPU 132 determines "NO" at S10 and proceeds to S30.

At S20, the CPU 132 causes the display 114 to display an instruction screen through which a user may instruct the printer 100 to disconnect an AP connection. The instruction screen includes a message asking a user whether he/she would like to disconnect an established AP connection, an OK button, and a cancel button.

At S22, the CPU 132 determines whether the OK button in the instruction screen is selected by a user. If the CPU 132 determines that the OK button is selected, the CPU 132 determines "YES" at S22 and proceeds to S24. If the CPU 132 determines that the cancel button is selected, the CPU 132 determines "NO" at S22 and ends the normal connection processing in FIG. 7.

At S24, the CPU 132 causes the Wi-Fi I/F 116 to disconnect an AP connection with the particular AP. In one example, the CPU 132 sends a disconnection request to the particular AP via the Wi-Fi I/F 116, and receives a response from the particular AP via the Wi-Fi I/F 116. The AP connection with the particular AP is thus disconnected. As described above, the Wi-Fi I/F 116 of the printer 100 is not configured to simultaneously establish AP connections with APs. Disconnecting the AP connection with the particular AP (e.g., 6A) at S24 allows the CPU 132 to establish an AP connection with a target AP (e.g., 6B) at subsequent S30 appropriately.

At S30, the CPU 132 executes an establishment processing for establishing an AP connection with the target AP. In the example case A1 in FIG. 2 in which the "manual connection" in the selection screen is selected, the CPU 132 causes the Wi-Fi OF 116 to establish an AP connection using wireless setting information (e.g., a SSID and a password), which is input by the user. In the example case A2 in FIG. 2 in which the "WPS connection" in the selection screen is selected, the CPU 132 causes the Wi-Fi I/F 116 to establish an AP connection using wireless setting information, which is received from the target AP.

At S32, the CPU 132 determines whether an AP connection has been successfully established. The AP connection is not successfully established, for example, if a user inputs wrong wireless setting information in the example case A1 in FIG. 2, or if a user does not perform a PBC on the target AP in the example case A2 in FIG. 2. If the AP connection has been successfully established, the CPU 132 determines "YES" at S32 and proceeds to S34. If an AP connection is not successfully established, the CPU 132 determines "NO" at S32 and proceeds to S36.

At S34, the CPU 132 stores new wireless information in the memory 134.

The new wireless information is wireless setting information input by a user in the example case A1, and wireless setting information received from the target AP in the example case A2. The CPU 132 deletes the previous wireless information from the memory 134 if any. Upon completion of S34, the CPU 132 ends the normal connection processing in FIG. 7.

When an AP connection with the particular AP is established, wireless information is stored in the memory 134. If the AP connection with the particular AP is disconnected at S24, the CPU 132 re-establishes an AP connection with the particular AP at S36, using the wireless information stored in the memory 134. Accordingly, the printer 100 is brought into a state, prior to S24, in which an AP connection has been established with the particular AP. If an AP connection is not disconnected at S24 (e.g., the CPU 132 determines "NO" at S10), the CPU 132 ends the normal connection processing in FIG. 7 without executing S36.

Figure 8:
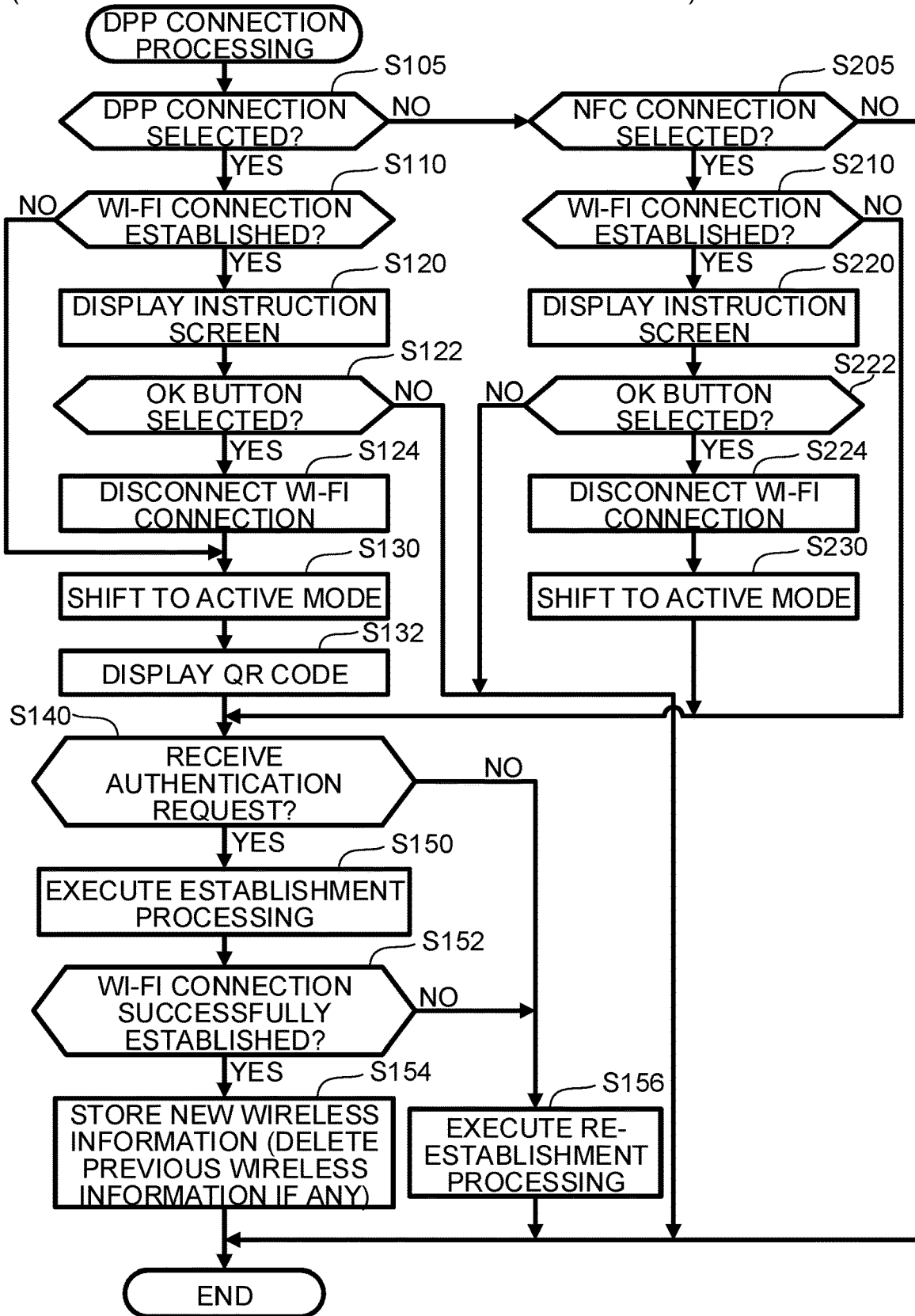
FIG. 8 is a flowchart illustrating DPP connection processing in the first and second illustrative embodiments according to one or more aspects of the disclosure.

(DPP Connection Processing; FIG. 8)

Referring to FIG. 8, DPP connection processing that the CPU 132 of the printer 100 executes in accordance with the program(s) 136 will now be described. Turning the printer 100 on causes the DPP connection processing to start. The DPP connection processing may be repeatedly executed while the printer 100 is turned on. Processing in FIG. 8 may be executed concurrently with the normal connection processing in FIG. 7.

At S105, the CPU 132 monitors user's selection of the "DPP connection" in the selection screen as displayed at T14 in FIG. 2. If the "DPP connection" is selected (refer to T70 in FIG. 3), the CPU 132 determines "YES" at S105 and proceeds to S110. Steps S110-S124 are similar to S10-S24 in FIG. 7.

At S130, the CPU 132 causes the printer 100 to shift an operating condition of the printer 100 from an inactive condition to an active condition. In the inactive condition, the printer 100 does not send the ARes (refer to T130) if the Wi-Fi I/F 116 receives AReq (refer to T110 in FIG. 4) from the terminal 10A or 10B. In the active condition, the printer 100 sends the ARes based on the Wi-Fi I/F 116 receiving the AReq from the terminal 10A or 10B. In other words, shifting from the inactive condition to the active condition allows the printer 100 to execute the Authentication (refer to in FIG. 4). In the illustrative embodiment, in the inactive condition, if the Wi-Fi I/F 116 receives a signal from the terminal 10A or 10B, the Wi-Fi I/F 116 does not provide the signal to the CPU 132. In the active condition, based on the Wi-Fi I/F 116 receiving a signal from the terminal 10A or 10B, the Wi-Fi I/F 116 provides the signal to the CPU 132 and sends a response to the signal, to the terminal 10A or 10B. Since the CPU 132 processes a signal received from the terminal 10A or 10B in the active condition, greater processing loads are placed on the CPU 132 in the active condition than in the inactive condition.

In some embodiments, the Wi-Fi I/F 116 may not be powered (e.g., current is not supplied to the Wi-Fi I/F 116) in the inactive condition and may be powered (e.g., current is supplied to the Wi-Fi I/F 116) in the active condition. In some embodiments, in the inactive condition, if the Wi-Fi I/F 116 receives an AReq from the terminal 10A or 10B, the Wi-Fi I/F 116 may not provide the CPU 132 with notification indicating that the AReq has been received. In the active condition, based on receiving an AReq from the terminal 10A or 10B, the Wi-Fi I/F 116 may provide the CPU 132 with such notification indicating that the AReq has been received.

At S132, the CPU 132 causes the display 114 to display a screen including the QR code (refer to T72 in FIG. 3). Upon completion of S132, the CPU 132 proceeds to S140.

At S205, the CPU 132 monitors the establishment of the NFC connection with the terminal 10A. The CPU 132 may repeatedly execute the determinations at S105 and S205. If the CPU 132 obtains, from the NFC I/F 117, a notification indicating the NFC connection has been established (refer to the example case A3-2 in FIG. 3), the CPU 132 determines "YES" at S205 and proceeds to S210. Steps S210-S230 are similar to S110-S130. Upon completion of S230, the CPU 132 proceeds to S140.

At S140, the CPU 132 monitors the reception of the AReq from the terminal 10A. If the CPU 132 receives the AReq from the terminal 10A via the Wi-Fi I/F 116 (refer to T110 in FIG. 4), the CPU 132 determines "YES" at S140, and proceeds to S150. If the CPU 132 does not receive the AReq from the terminal 10A during a predetermined period of time after the completion of S132 or S230, the CPU 132 determines "NO" at S140 and proceeds to S156, which is similar to S36 in FIG. 7.

At S150, the CPU 132 executes processing for establishing an AP connection with a target AP. In one example, the CPU 132 executes processes similar to T112-T130, T140, and T144 in FIG. 4; T200, T210, and T212 in FIG. 5; T310 and T320-T324 in FIG. 6; and T62 in FIG. 2.

A comparative printer in accordance with other embodiments of the present disclosure will now be described. The comparative printer is configured to disconnect an AP connection with the particular AP after shifting to the active condition. More specifically, if the comparative printer determines "YES" at S122 or S222, the printer shifts to the active condition (e.g., executes S130 or S230) without disconnecting an AP connection with the particular AP (e.g., without executing S124 or S224). The printer in the active condition receives the AReq from the terminal 10A and sends the ARes to the terminal 10A. The printer executes communication in accordance with the DPP (hereinafter referred to as "DPP communication") with the terminal 10A or the target AP in the processes of the Authentication, the Configuration, and the Network Access. Subsequently, the printer disconnects an AP connection with the particular AP, and establishes an AP connection with the target AP. In this case, the printer executes the DPP communication in a state in which an AP connection has been established with the particular AP. In such state, greater processing and communication loads are placed on the printer, as compared with a state in which an AP connection is not established. This may cause the printer to fail to appropriately execute DPP communication. In short, the comparative printer may not establish an AP connection with the target AP.

In the illustrative embodiment, after the printer 100 disconnects an AP connection with the particular AP (e.g., after S124 or S224 is executed), the printer 100 shifts to the active condition (S130, S230). The printer 100 may execute the DPP communication appropriately since the printer 100 does not have to execute DPP communication in a state in which the AP connection with the particular AP has been established. This configuration may allow the printer 100 to establish an AP connection with the target AP appropriately.

At S152, the CPU 132 determines whether an AP connection has been successfully established. The AP connection is not successfully established, for example, if the target AP is turned off prior to S150. If the AP connection has been successfully established, the CPU 132 determines "YES" at S152 and proceeds to S154. If an AP connection is not successfully established, the CPU 132 determines "NO" at S152 and proceeds to S156.

At S154, the CPU 132 stores new wireless information in the memory 134. The new wireless information includes the printer configuration object received from the terminal 10A (refer to T212 in FIG. 5) in the Configuration at S150, and the connector key (refer to T324 in FIG. 6) generated in the Network Access at S150. The CPU 132 deletes the previous wireless information from the memory 134 if any. Upon completion of S154, the DPP connection processing in FIG. 8 ends.

Figure 9:
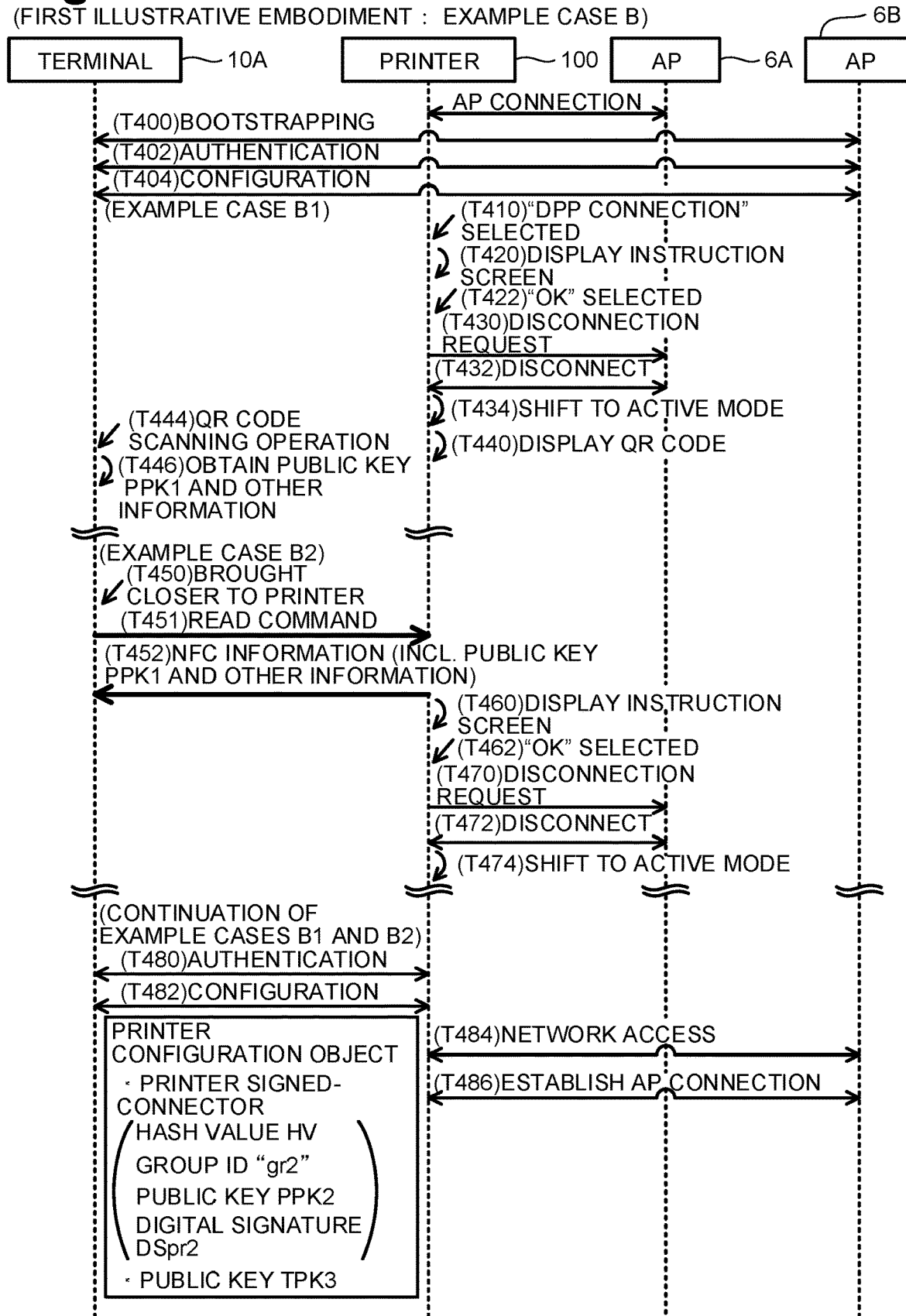
FIG. 9 is a sequence diagram of a specific example case in the first illustrative embodiment according to one or more aspect of the disclosure.

Specific Example Case; FIG. 9

Referring to FIG. 9, a specific example case B in the first illustrative embodiment will now be described. In a state in the example case B prior to an execution of T400, any one of the example cases A1-A3 in FIG. 2 has already been executed and an AP connection is established between the printer 100 and the AP 6A. An administrator of the communication system 2 (e.g., a user) establishes an AP connection between the printer 100 and the AP 6B, in replace of the AP connection between the printer 100 and the AP 6A.

Steps T400-T404 are similar to T40-T44 in FIG. 2, except that the AP 6B is used (e.g., the terminal 10A executes T400-T404 with the AP 6B instead of the AP 6A). At T400, the terminal 10A scans a QR code of the AP 6B. The QR code is obtained by encoding a public key of the AP 6B, a channel list of the AP 6B, and a MAC address "Mapb" of the AP 6B. For example, in a case where the example case A3 in FIG. 2 is executed and an AP connection is established between the printer 100 and the AP 6A, the AP 6A signed-connector in the AP 6A configuration object includes the group ID "gr1" (refer to a state of the AP 6A in FIG. 6 prior to execution of T310). In contrast, an AP 6B signed-connector in an AP 6B configuration object that is generated at T404 by the terminal 10A includes a group ID "gr2", which is different from the group ID "gr1". The AP 6B signed-connector further includes a hash value HV, a public key of the AP 6B, which is different from the public key APK2 of the AP 6A, and a digital signature, which is different from the digital signature DSap. The AP 6B configuration object includes the AP 6B signed-connector and a public key TPK3 of the terminal 10A. The public key TPK3 is different from the public keys TPK1 and TPK2. Subsequent to S404, one of example cases B1 and B2 is executed.

Example Case B1

In the example case B1, the printer 100 receives, at T410, a user's selection of the "DPP connection" in the selection screen ("YES" at S105 in FIG. 8). In this case, the printer 100 displays, at T420, the instruction screen (at S120 through "YES" at S110). At T422, the printer 100 receives a user's selection of the OK button in the instruction screen ("YES" at S122). At T430, the printer 100 sends a disconnection request to the AP 6A, and disconnects the AP connection with the AP 6A at T432 (S124).

Subsequently, at T434, the printer 100 shifts to the active condition (S130), and displays the QR code of the printer 100 at T440 (S132). Steps T444 and T446, which are respectively similar to T74 and T76 in FIG. 3, are executed, and the terminal 10A obtains the public key PPK1 and other information.

(Example Case B2)

In the example case B2, based on the terminal 10A brought in close proximity to the printer 100 at T450, the printer 100 receives, at T451, a Read command from the terminal 10A using the NFC connection. In this case, the printer 100 sends, at T452, NFC information including, for example, the public key PPK1, to the terminal 10A, so that the terminal 10A may obtain the public key PPK1 and other information. Steps T460-T474 are similar to T420-T434.

Continuation of Example Cases B1 and B2

Subsequent to the example case B1 and B2, T480-T484 are executed. Steps T480 and T482 are respectively similar to T52 and T54 in FIG. 2, and T484 is similar to T60 in FIG. 2, except that the AP 6B is used (e.g., the printer 100 executes T484 with the AP 6B, instead of the AP 6A). A printer signed-connector in a printer configuration object generated by the terminal 10A at T482 includes a group ID "gr2". The group ID "gr2" is different from the group ID "gr1", which is included in the printer signed-connector in the printer configuration object generated by the terminal 10A at T202 in FIG. 5, as described above. Since the printer signed-connectors at T202 and T482 include different group IDs, the printer signed-connector at T482 includes a different digital signature DSpr2 from the digital signature DSpr1, which is generated by the terminal 10A at T202 in FIG. 5. The printer configuration object generated by the terminal 10A at T482 includes the public key TPK3 of the terminal 10A.

Subsequently, the printer 100 establishes an AP connection with the AP 6B at T486. In place of the AP connection with the AP 6A, the printer 100 thus establishes an AP connection with the AP 6B, and joins a wireless network formed by the AP 6B, as a child station device. The printer 100 receives the AReq from the terminal 10A, using one of the communication channels listed or represented in the channel list CL of the printer 100 at T480 (refer to T110 in FIG. 4). In other words, the printer 100 receives the AReq from the terminal 10A using the communication channel usable both by the printer 100 and the terminal 10A. At T486 in FIG. 9, the printer 100 establishes an AP connection with the AP 6B using the communication channel usable both by the printer 100 and the AP 6B. The communication channel usable by the terminal 10A may be different from the communication channel usable by the AP 6B. In the illustrative embodiment, a communication channel used by the printer 100 to receive the AReq from the terminal 10A at T480 is different from a communication channel used by printer 100 to establish an AP connection with the AP 6B at T486. In another embodiment, a communication channel used by the printer 100 to receive an AReq from the terminal 10A at T480 may be the same as the communication channel used by printer 100 to establish an AP connection with the AP 6B at T486.

Advantageous Effects of First Illustrative Embodiment

In the first illustrative embodiment, subsequent (e.g., responsive) to receiving an instruction for outputting a QR code or NFC information obtained using the public key PPK1 (T410, T451 in FIG. 9) in a state in which an AP connection has been established between the printer 100 and the AP 6A, the printer 100 disconnects the AP connection between the printer 100 and the AP 6A (T432, T472). This configuration may prevent such a situation that a new AP connection is not established due to another AP connection established. The printer 100 receives an AReq (T480) from the terminal 10A. The AReq includes the encrypted data ED1, which is generated by encrypting the random value RV1 using the shared key SK1. The shared key SK1 is generated using the public key PPK1. The printer 100 sends an ARes to the terminal 10A (T480). The printer 100 receives the printer configuration object from the terminal 10A (T482). The printer 100 may appropriately establish an AP connection, using the printer configuration object, between the printer 100 and the AP 6B (T484, T486).

(Correspondence)

The printer 100 is an example of a "communication device". The terminal 10A is an example of a "terminal device". The AP 6A is an example of a "first external device". The AP 6B is an example of a "second external device (and a parent station device)". The Wi-Fi I/F 116 is an example of a "first wireless interface". The NFC I/F 117 is an example of a "second wireless interface". The display 114 and the NFC I/F 117 are examples of an "output device". An instruction at T70 in FIG. 3 and the Read command at T81 in FIG. 3 are an example of an "output instruction". The AP connection between the printer 100 and the AP 6A in FIG. 9, is an example of a "first wireless connection". The AP connection between the printer 100 and the AP 6B in FIG. 9, is an example of a "second wireless connection". The public key PPK1 of the printer 100 is an example of a "public key". The QR code of the printer 100 and the NFC information are an example of "specific information". The AReq is an example of an "authentication request". The ARes is an example of an "authentication response". The printer configuration object received from the terminal 10A at T482 in FIG. 9 is an example of "connection information". The channel list CL is an example of a "communication channel information". The communication channel used at T480 in FIG. 9 is an example of a "first communication channel". The communication channel used at T486 in FIG. 9 is an example of a "second communication channel". An AP 6B signed-connector received from the AP 6B at T484 (e.g. AP 6B signed-connector generated by the terminal 10A at T404) is an example of "received information". The hash value HV generated by the terminal 10A at T482 and included in the printer signed-connector is an example of "authentication information".

Step T480 in FIG. 9 is an example of a process that is executed by an "authentication request receiver" and by an "authentication response sender". Step T434 (and T474) is an example of a process that is executed by a "condition shift unit". Step T482 is an example of a process that is executed by a "connection information receiver". Step T486 is an example of a process that is executed by a "first establishing unit". Step S120 (and S220) in FIG. 8 is an example of a process that is executed by a "second display controller". Step S124 (and S224) is an example of a process that is executed by a "disconnecting unit". Step S154 is an example of a process that is executed by a "deleting unit". Step S156 is an example of a process that is executed by a "second establishing unit".

Second Illustrative Embodiment

In the second illustrative embodiment, the Wi-Fi I/F 116 of the printer 100 supports Wi-Fi Direct (registered trademark) ("WFD") defined by Wi-Fi Alliance. The Wi-Fi I/Fs 16 of the terminals 10A and 10B also support the WFD. The WFD is wireless communication technique defined in "Wi-Fi Peer-to-Peer (P2P) Technical Specification Version1.1" by Wi-Fi Alliance. The specification of the WFD defines three roles of WFD supported-devices; a Group Owner ("G/O") role, a client role, and a device role. A WFD supported-device selectively operates in one of the three roles.

The Wi-Fi I/F 116 has a MAC address "Mwfd", which is different from the MAC address "Mlan". In the second illustrative embodiment, the Wi-Fi I/F 116 does not establish an AP connection, but establishes a Wi-Fi connection, in accordance with the WFD (hereinafter referred to as a "WFD connection"), with a terminal (e.g., 10A). The Wi-Fi I/F 116 having one MAC address "Mwfd" is configured to establish a WFD connection with one terminal (e.g., 10A) using the MAC address. In short, the Wi-Fi I/F 116 will not be able to simultaneously establish a plurality of WFD connections with a plurality of terminals.

Figure 10:
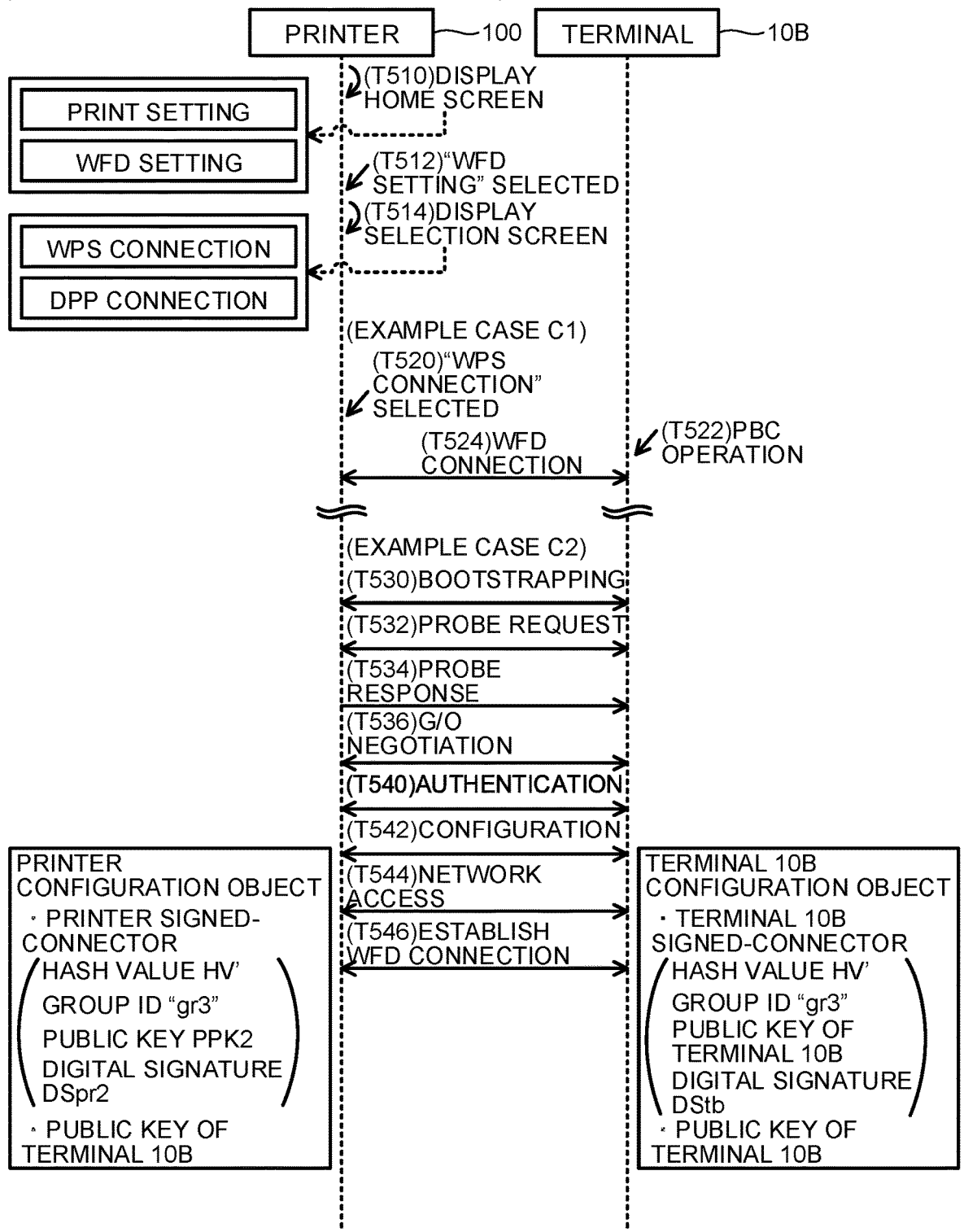
FIG. 10 is a sequence diagram of specific example cases in the second illustrative embodiment according to one or more aspects of the disclosure.

(WFD Connection Between Printer 100 and Terminal 10B; FIG. 10)

In the second illustrative embodiment, users of the respective the terminals 10A and 10B share the printer 100. Referring to FIG. 10, processing for establishing a WFD connection between the printer 100 and the terminal 10B will now be described.

Turning the printer 100 on causes the display 114 to display a home screen at T510. The home screen may include character strings "print setting" and "WFD setting".

Based on a user's selection of the "WFD setting" in the home screen at T512, the printer 100 causes the display 114 to display a selection screen at T514. The selection screen may include character strings "WPS connection" and "DPP connection". The "WPS connection" is a method for establishing a WFD connection in accordance with WPS, based on an operation of a predetermined button on a terminal (e.g., 10B) (e.g., based on execution of a PBC operation). The "DPP connection" is a method for establishing, using a terminal, a WFD connection in accordance with the DPP.

Example Case C1

In an example case C1, the printer 100 receives, at T520, a user's selection of the "WPS connection" in the selection screen. Subsequently, based on execution of the PBC operation on the terminal 10B at T522, the printer 100 communicates with the terminal 10B (e.g., each of the printer 100 and the terminal 10B sends various signals to each other) at T524, and establishes a WFD connection with the terminal 10B. The various signals may include, for example, a Probe, a G/O negotiation, a Discovery, a WPS negotiation, an Authentication, an Association, and a four-way handshake. Upon completion of T524, a wireless network is formed in which one of the printer 100 and the terminal 10B operates in the G/O role while the other one of the printer 100 and the terminal 10B operates in the client role. Using the wireless network, the printer 100 is allowed to communicate with the terminal 10B.

Example Case C2

Figure 11:
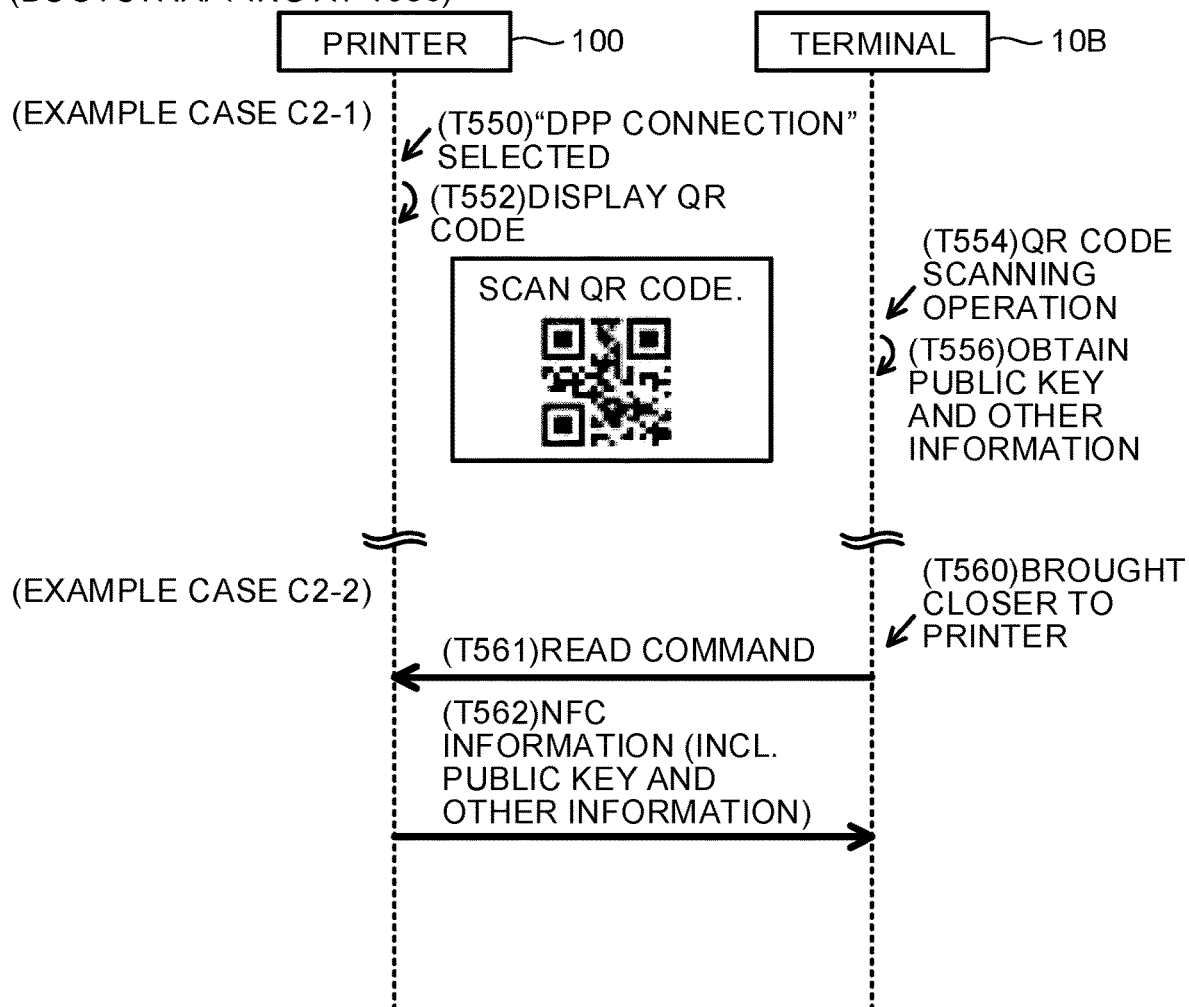
FIG. 11 is a sequence diagram of Bootstrapping in the second illustrative embodiment according to one or more aspect of the disclosure.

In an example case C2, subsequent to receiving a user's instruction for starting up the app 38, the terminal 10B executes, at T530, DPP Bootstrapping with the printer 100. The Bootstrapping at T530 will be described in conjunction with the following two example cases C2-1 and C2-2. The example case C2-1 may include T550-T556 in FIG. 11, which are similar to T70-T76 in FIG. 3, except that a QR code that is obtained by encoding the MAC address "Mwfd" is used in example case C2-1, instead of the MAC address "Mlan". The example case C2-2 may include T560-T562, which are similar to T80-T82 in FIG. 3, except that the MAC address "Mwfd" is sent to the terminal 10B. In either example case C2-1 or C2-2, the terminal 10B obtains the public key PPK1 of the printer 100, the channel list CL, and the MAC address "Mwfd".

At T532 in FIG. 10, the printer 100 receives a Probe Request from the terminal 10B via the Wi-Fi I/F 116. At T534, the printer 100 sends, via the Wi-Fi I/F 116, a Probe Response including the MAC address "Mwfd", to the terminal 10B.

The terminal 10B receives, at T534, a signal including the MAC address "Mwfd". Since the terminal 10B has already obtained the MAC address "Mwfd" in the Bootstrapping at T530, the terminal 10B may understand that the sender of the signal is a device that the terminal 10B is to connect to. In subsequent processes, the terminal 10B sends various signals to the printer 100, e.g., the MAC address "Mwfd" as a recipient.

At T536, the printer 100 executes the G/O negotiation with the terminal 10B and determines whether the printer 100 operates in the G/O role or the client role. The subsequent Authentication at T540 and Configuration at T542 are similar to T52 and T54 in FIG. 2, respectively. Upon completion of T542, the printer 100 stores a printer configuration object therein. The printer configuration object includes a printer signed-connector, and a public key of the terminal 10B. The printer signed-connector includes a hash value HV', a group ID "gr3", a public key "PPK2" of the printer 100, and a digital signature DSpr2. The hash value HV' is obtained by performing a hash function of the public key of the terminal 10B.

The Network Access at T544 is similar to T60 in FIG. 2, except that the terminal 10B executes T544, instead of the AP 6A. At T544, the terminal 10B generates a CO for the terminal 10B (hereinafter referred to as a "terminal 10B configuration object") and executes the Network Access, authentication of the printer 100, and generates a connector key, using the terminal 10B configuration object. The terminal 10B configuration object includes a signed-connector for the terminal 10B (which may be referred to as the "terminal 10B signed-connector"), and the public key of the terminal 10B. The terminal 10B signed-connector includes a hash value HV', the group ID "gr3", the public key of the terminal 10B, and a digital signature DStb.

At T546, the printer 100 establishes a WFD connection between the printer 100 and the terminal 10B, using a connector key shared at T544. Upon establishment of the WFD connection in either example case C1 or C2, the printer 100 stores wireless information in the memory 134. The wireless information may be wireless setting information (e.g., a SSID and a password) in the example case C1, and may be a printer configuration object and a connector key in the example case C2.

Normal connection processing and DPP connection processing that are executed in the second illustrative embodiment will now be described. Processing in FIGS. 7 and 8 in the second illustrative embodiment are similar to processing in FIGS. 7 and 8 in the first illustrative embodiment, except that a WFD connection is made instead of an AP connection, and the MAC address for WFD (e.g., "Mwfd") is used instead of the MAC address for Wi-Fi (e.g., "Mlan"). As described above, the Wi-Fi I/F 116 of the printer 100 is not configured to simultaneously establish WFD connections with a plurality of terminals. If a WFD connection with a first terminal (e.g., 10B) is disconnected at S24 in FIG. 7 or S124/S224 in FIG. 8, the CPU 132 may appropriately establish a WFD connection with a second terminal (e.g., 10A) at S30 in FIG. 7 or S150 in FIG. 8.

Figure 12:
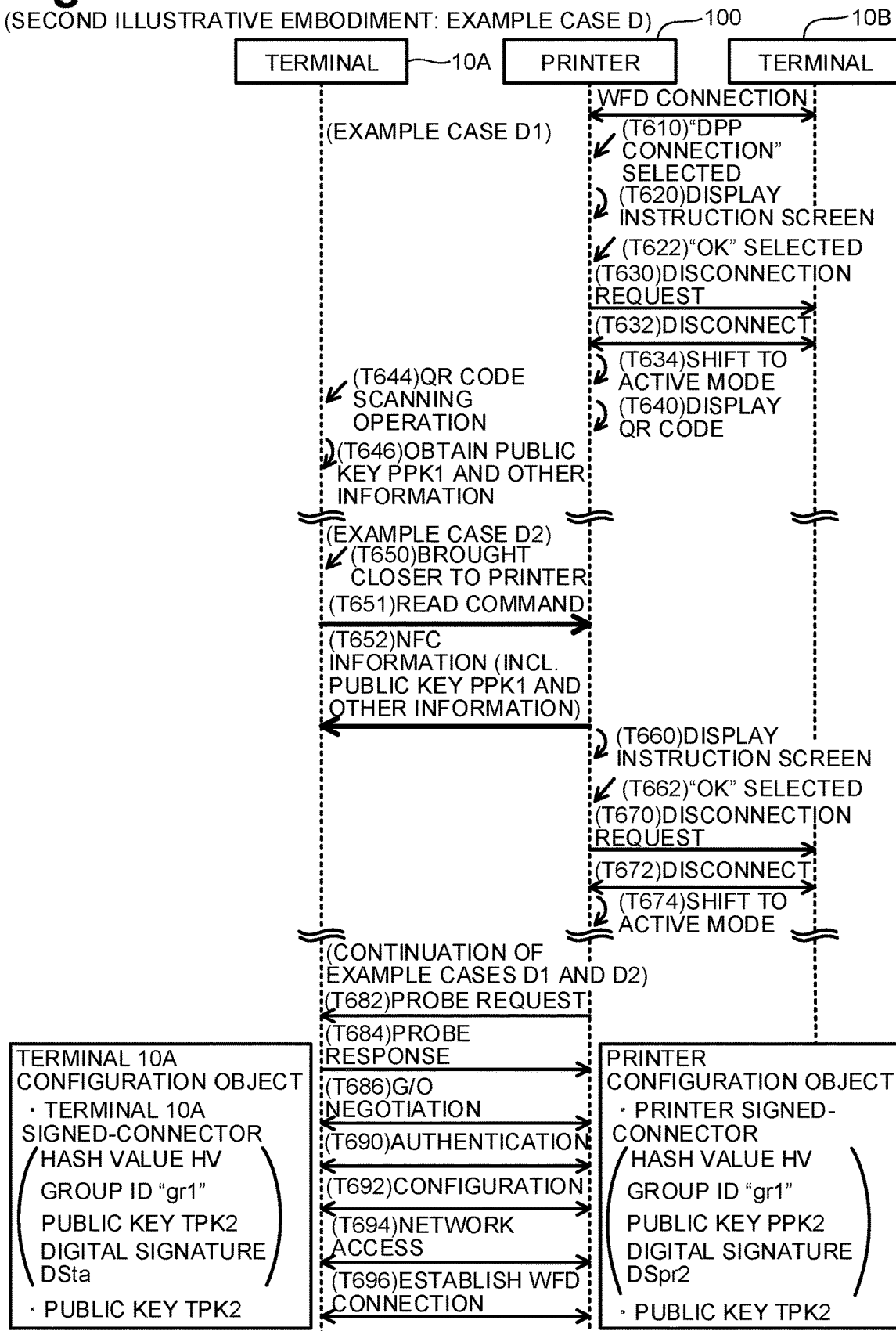
FIG. 12 is a sequence diagram continuing from FIG. 10.

(WFD Connection Between Printer 100 and Terminal 10A; FIG. 12)

Referring to FIG. 12, a specific example case D that is implemented by the processing in FIGS. 7 and 8 in the second illustrative embodiment will now be described. The example case D is continued from FIG. 10, and a WFD connection has been established between the printer 100 and the terminal 10B (T524, T546 in FIG. 10). Subsequently, either one of example cases D1 and D2 is executed.

The example case D1 includes T610-T646, which are similar to T410-T446 in FIG. 9 except that a WFD connection with the terminal 10B is disconnected (S105-S132 in FIG. 8; "YES" at S105, S110, and S122). The example case D2 includes T650-T674, which are similar to T450-T474 in FIG. 9 except that a WFD connection with the terminal 10B is disconnected (S205-S230 in FIG. 8; "YES" at S205, S210 and S222).

Steps T682-T696, which are executed subsequent to the example case D1 or D2, are similar to T532-T546 in FIG. 10, except that the terminal 10A executes T682-T696 with the printer 100. A printer configuration object generated by the terminal 10A at T692 is the same as the printer configuration object generated at T202 in FIG. 5. A terminal 10A configuration object generated by the terminal 10A at T694 includes a terminal 10A signed-connector, and the public key TPK2 of the terminal 10A. The terminal 10A signed-connector includes the hash value HV, the group ID "gr1", the public key "TPK2" of the terminal 10A, and a digital signature DSta.

Advantageous Effects of Second Illustrative Embodiment

In the second illustrative embodiment, subsequent to receiving an instruction for outputting a QR code or NFC information obtained using the public key PPK1 (T610, T651 in FIG. 12) in a state in which a WFD connection has been established between the printer 100 and the terminal 10B, the printer 100 disconnects the WFD connection (T632, T672). This configuration may prevent such a situation that a new WFD connection is not established due to another WFD connection established. The printer 100 receives an AReq (T690) from the terminal 10A. The AReq includes the encrypted data ED1, which is generated by encrypting the random value RV1 using the shared key SK1. The shared key SK1 is generated using the public key PPK1. The printer 100 sends an ARes to the terminal 10A (T690). The printer 100 receives the printer configuration object from the terminal 10A (T692). The printer 100 may appropriately establish a WFD connection, using the printer configuration object, between the printer 100 and the terminal 10A (T694, T696).

(Correspondence)

The terminal 10B is an example of a "first external device". The terminal 10A is an example of a "terminal device" and a "second external device". The WFD connection between the printer 100 and the terminal 10B in FIG. 12 is an example of a "first wireless connection". The WFD connection between the printer 100 and the terminal 10A in FIG. 12 is an example of a "second wireless connection".

Third Illustrative Embodiment

In a third illustrative embodiment, the printer 100 does not include the NFC OF 117. The Wi-Fi I/F 116 has two MAC addresses (e.g., "Mlan" and "Mwfd"). The MAC address "Mlan" is used for establishing an AP connection while the MAC address "Mwfd" is used for establishing a WFD connection. This allows the Wi-Fi I/F 116 to simultaneously establish an AP connection and a WFD connection using the MAC addresses "Mlan" and "Mwfd", respectively. In the third illustrative embodiment, the Wi-Fi OF 116 also is configured not to simultaneously establish a plurality of AP connections or a plurality of WFD connections, similar to the first and second illustrative embodiments.

Figure 13:
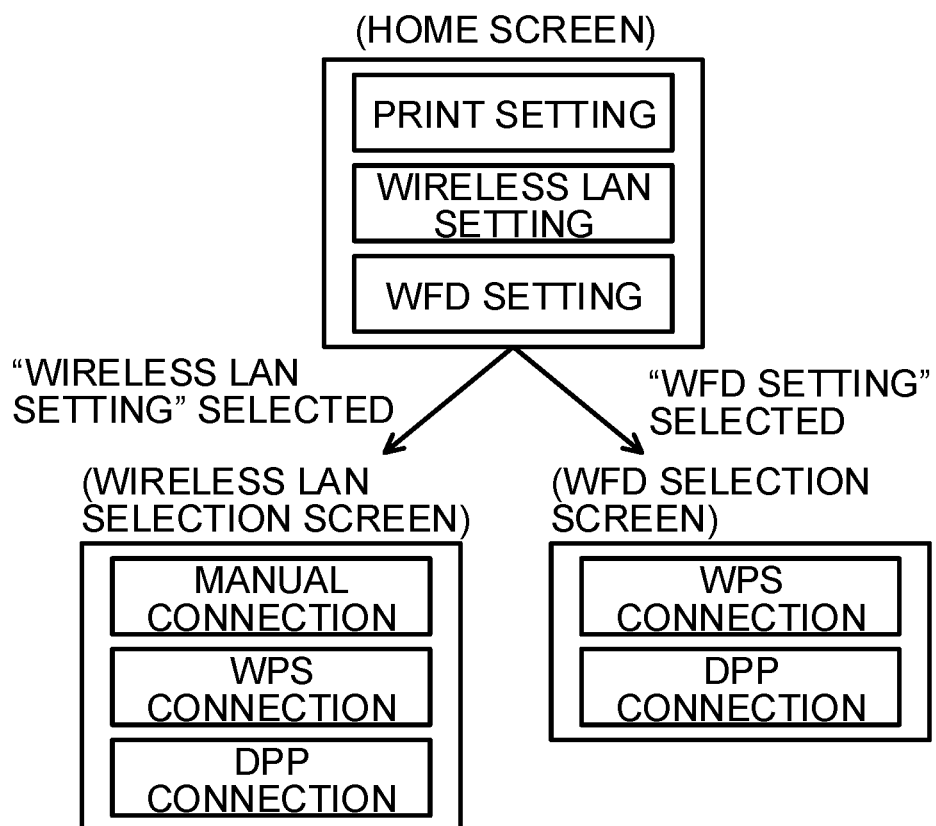
FIG. 13 illustrates a diagram of screens displayed in the printer in a third illustrative embodiment according to one or more aspects of the disclosure.

(Screens Displayed in Printer 100; FIG. 13)

As depicted in FIG. 13, a home screen in the third illustrative embodiment includes character strings "print setting", "wireless LAN setting", and "WFD setting". If a user selects the "wireless LAN setting" in the home screen, the printer 100 displays a wireless LAN selection screen. If a user selects the "WFD setting" in the home screen, the printer 100 displays a WFD selection screen. The wireless LAN selection screen is similar to the selection screen at T14 in FIG. 2. The WFD selection screen is similar to the selection screen at T514 in FIG. 10.

(Normal Connection Processing; in FIG. 14)

In the third illustrative embodiment, normal connection processing in FIG. 14 is executed instead of the normal connection processing in FIG. 7. The normal connection processing in FIG. 14 may also be repeatedly executed while the printer 100 is turned on.

At S5A, the CPU 132 monitors user's selection of the "manual connection" or "WPS connection" in the wireless LAN selection screen. If the CPU 132 determines "YES" at S5A, the CPU 132 determines, at S10A, whether an AP connection is established at present. If the CPU 132 determines "YES" at S10A, the CPU 132 executes processes similar to S20 and S22 in FIG. 7, and causes the Wi-Fi I/F 116 to disconnect the AP connection at S24A. Subsequently, the CPU 132 executes processes similar to S30-S36 in FIG. 7. If the CPU 132 determines "NO" at S10A, the CPU 132 executes processes similar to S30-S36 without performing S20-S24A. At S30, the CPU 132 causes the Wi-Fi OF 116 to establish an AP connection using the MAC address "Mlan".

At S5B, the CPU 132 monitors user's selection of the "WPS connection" in the WFD selection screen. The CPU 132 repeats determinations at S5A and S5B. If the CPU 132 determines "YES" at S5B, the CPU 132 then determines whether a WFD connection is established at present at S10B. If the CPU 132 determines "YES" at S10B, the CPU 132 executes processes similar to S20 and S22 in FIG. 7 and causes the Wi-Fi OF 116 to disconnect a WFD connection at S24B. Subsequently, the CPU 132 executes processes similar to S30-S36 in FIG. 7. If the CPU 132 determines "NO" at S10B, the CPU 132 executes processes similar to S30-S36 without performing S20-S24B. At S30, the CPU 132 causes the Wi-Fi I/F 116 to establish a WFD connection using the MAC address "Mwfd".

(DPP Connection Processing; FIG. 15)

In the third illustrative embodiment, DPP connection processing in FIG. 15 is executed instead of the DPP connection processing in FIG. 8. The DPP connection processing in FIG. 15 may also be repeatedly executed while the printer 100 is turned on. Processing in FIG. 15 may be executed concurrently with the normal connection processing in FIG. 14.

At S105A, the CPU 132 monitors user's selection of the "DPP connection" in the wireless LAN selection screen. If the CPU 132 determines "YES" at S105A, the CPU 132 determines, at S110A, whether an AP connection is established at present. If the CPU 132 determines "YES" at S110A, the CPU 132 executes processes similar to S120 and S122 in FIG. 8 and causes the Wi-Fi I/F 116 to disconnect the AP connection at S124A. Subsequently, at S130A, the CPU 132 causes the printer 100 to shift from the inactive condition to the active condition. If the CPU 132 determines "NO" at S110A, the CPU 132 proceeds to S130A without executing S120-S124A. Subsequently, at S132A, the CPU 132 causes the display 114 to display a QR code of the printer 100. The QR code may be obtained by encoding the public key PPK1, the channel list CL, and the MAC address "Mlan". Subsequently, the CPU 132 executes processes similar to S140-S156.

At S105B, the CPU 132 monitors user's selection of the "DPP connection" in the WFD selection screen. The CPU 132 repeats determinations at S105A and S105B. If the CPU 132 determines "YES" at S105B, the CPU 132 determines, at S110B, whether a WFD connection is established at the present. If the CPU 132 determines "YES" at S110B, the CPU 132 executes processes similar to S120 and S122 in FIG. 8, and causes the Wi-Fi I/F 116 to disconnect the WFD connection at S124B. Subsequently, at S130B, the CPU 132 causes the printer 100 to shift from the inactive condition to the active condition. If the CPU 132 determines "NO" at S110B, the CPU 132 proceeds to S130B without performing S120-S124B. Subsequently, at S132B, the CPU 132 causes the display 114 to display a QR code of the printer 100. The QR code may be obtained by encoding the public key PPK1, the channel list CL, the MAC address "Mwfd". In short, the QR code displayed at S132B is different from the QR code displayed at S132A. Subsequently, the CPU 132 executes processes similar to S140-S156.

Advantageous Effects of Third Illustrative Embodiment

If the printer 100 receives an instruction for establishing a second AP connection in a state in which a first AP connection has been established ("YES" at S5A in FIG. 14, "YES" at S10A, "YES" at S105A in FIG. 15, "YES" at S110A), the printer 100 disconnects the first AP connection (S24A, S124A). This may allow for an appropriate establishment of the second AP connection. If the printer 100 receives an instruction for establishing a second WFD connection in a state in which a first WFD connection has been established ("YES" at S5B, "YES" at S10B, "YES" at S105B, "YES" at S110B), the printer 100 disconnects the first WFD connection (S24B, S124B). This may allow for an appropriate establishment of the second WFD connection. In a case where the printer 100 receives an instruction for establishing a WFD connection in a state in which an AP connection has been established ("YES" at S5B, "NO" at S10B, "YES" at S105B, "NO" at S110B), the printer 100 does not disconnect the AP connection. In a case where the printer 100 receives an instruction for establishing an AP connection in a state in which a WFD connection has been established ("YES" at SSA, "NO" at S10A, "YES" at S105A, "NO" at S110A), the printer 100 does not disconnect the WFD connection. Since the printer 100 does not disconnect an AP connection or a WFD connection in those cases, the printer 100 may execute communication appropriately using AP connection and the WFD connection.

(Correspondence)

The MAC address "Mlan" is an example of a "first MAC address". The MAC address "Mwfd" is an example of a "second MAC address". The AP connection is an example of a "first type wireless connection". The WFD connection is an example of a "second type wireless connection". The "wireless LAN setting" in the home screen is an example of a "first selection area". The "WFD setting" in the home screen is an example of a "second selection area". The three screens in FIG. 13 (e.g., the home screen, the wireless LAN selection screen, and the WFD selection screen) are an example of "one or more selection screens".

While aspects are described in detail with reference to the specific embodiments thereof, this is merely an example, and various changes, arrangements and modifications may be made therein without departing from the spirit and scope of the disclosure. Modifications to the illustrative embodiments are given below.

(Modification 1) The QR code displayed in the printer 100 may be a coded image that is not obtained by encoding the channel list CL and the MAC address. In other words, a QR code may be a coded image that is obtained by encoding at least the public key PPK1. The NFC information at T452 might not necessarily include the channel list CL and the MAC address. In other words, the "specific information" may be information that is obtained using a public key.

(Modification 2) A shared key (e.g., SK1) may be generated (e.g., at T101 in FIG. 4), based on the ECDH, in a manner different from the illustrative embodiments. A shared key may be generated based on a method, e.g., Diffie-Hellman key exchange ("DH"), other than the ECDH. In the illustrative embodiments, a digital signature is generated based on the ECDSA. In another embodiment, a digital signature may be generated based on, for example, Digital Signature Algorithm ("DSA") or Rivest-Shamir-Adleman cryptosystem ("RAS").

(Modification 3) For example, instead of displaying a QR code in the printer 100 at T72, the printer 100 may cause the print execution unit 118 to print a QR code on a recording medium (e.g., sheet of paper). In this modification, the print execution unit 118 is an example of the "output device". In another embodiment, the printer 100 may include a Bluetooth ("BT") I/F, instead of the NFC I/F 117. The BT OF allows for communication in accordance with Bluetooth (registered trademark) technology. In this configuration, the printer 100 may send the public key PPK1, the channel list CL, and the MAC address "Mlan", via the BT I/F. In this modification, the BT OF is an example of the "output device" and the "second wireless interface". In this modification, the "specific information" might not necessarily be a "coded image". The BT OF may be an interface that complies with Bluetooth Low Energy or Bluetooth specification 4.0 or later.

(Modification 4) "DRAFT Device Provisioning Protocol Technical Specification Version 0.2.11" released by Wi-Fi Alliance, states that a shared code, key, phrase, or word is referred to as a "code". Accordingly, the printer 100 may display, instead of a QR code, an image including a shared code, key, phrase, or word that is obtained by encoding the public key PPK1 and other information, in the display 114.

(Modification 5) In FIGS. 8, S154 and S156 may be omitted. In this modification, a "deleting unit" and a "second establishing unit" may be omitted. Steps S120, S122, S220, and S222 may be omitted. In this modification, the "second display controller" may be omitted.

(Modification 6) The printer 100 may be shifted from the inactive condition to the active condition prior to disconnecting a Wi-Fi connection at S124 or S224 in FIG. 8 (e.g., at a time between S105 and S110 or between S205 and S210). In another modification, the printer 100 may always operate in the active condition and the "condition shift unit" may be omitted.

(Modification 7) The printer 100 might not necessarily disconnect a Wi-Fi connection at S124 or S224 in FIG. 8. The Wi-Fi connection may be disconnected, for example, after the Authentication but before the Configuration; after the Configuration but before the Network Access; or after the Network Access but before establishing an AP connection or a WFD connection.

(Modification 8) Examples of the "communication device" may include devices, other than the printer 100, such as a scanner, a multi-function device, a mobile terminal, a PC, and a server.

(Modification 9) In the illustrative embodiments, processes in FIGS. 2-15 are performed by the CPU 32 of the terminal 10A or 10B that executes the programs 36 and 38 (e.g., software) and/or the CPU 132 of the printer 100 that executes the program(s) 136 (e.g., software). Alternatively, at least one of processes in FIGS. 2-15 may be executed by hardware, e.g., a logical circuit.

The technical elements described in the specification or the drawings may exhibit technical usefulness, either alone or in combination, and combinations are not limited to those described in the claims as filed. The techniques illustrated in the specification or the drawings may achieve a plurality of objectives at the same time, and achieving only one of them has technical usefulness.

What is claimed is:

1. A communication device comprising:
   a first wireless interface;
   an output device configured to output specific information in a case where an output instruction which is a predetermined operation on the communication device is accepted, wherein the specific information is a code image obtained by coding a public key of the communication device;
   one or more processors; and
   memory storing instructions that, when executed by the one or more processors, cause the communication device to:
   after the public key is obtained by a terminal device which captures the code image outputted by the output device, receive, from the terminal device via the first wireless interface, an authentication request generated using the public key;
   send, to the terminal device via the first wireless interface, an authentication response responsive to the authentication request;
   after the authentication response is sent to the terminal device, receive, from the terminal device via the first wireless interface, connection information for establishing a second wireless connection between the communication device and a second external device via the first wireless interface; and
   after the connection information is received from the terminal device, establish, using the connection information, the second wireless connection between the communication device and the second external device,
   wherein the first wireless interface is capable of simultaneously establishing a first type wireless connection and a second type wireless connection different from the first type wireless connection,
if the output instruction for establishing the second type wireless connection is accepted in a state where a first wireless connection which is the first type wireless connection via the first wireless interface is established between the communication device and a first external device different from the second external device, the first wireless connection is not disconnected, and
if the output instruction for establishing the first type wireless connection is accepted in a state where the first wireless connection which is the second type wireless connection via the first wireless interface is established between the communication device and the first external device, the first wireless connection is not disconnected,
wherein the first type wireless connection is an access point (AP) type wireless connection which is a wireless connection between the communication device and an access point, and
the second type wireless connection is a non-AP type wireless connection which is a wireless connection between the communication device and another device which is not the AP.

2. The communication device as in the claim 1, wherein the instructions, when executed by the one or more processors, further cause the communication device to shift an operating condition of the communication device from an inactive condition to an active condition,
wherein the inactive condition is a condition where the authentication response is not sent even if the authentication request is received from the terminal device, and
wherein the active condition is a condition where the authentication response is sent to the terminal device in response to receiving the authentication request from the terminal device.

3. The communication device as in the claim 2, wherein the specific information is the code image obtained by coding the public key and communication channel information,
wherein the communication channel information indicates a first communication channel predetermined in the communication device, and
wherein, in the active condition, the communication device monitors the first communication channel for the authentication request and sends the authentication response in response to receiving the authentication request.

4. The communication device as in the claim 3, wherein the second wireless connection is established between the communication device and the second external device using a second communication channel, and
wherein the second communication channel is different from the first communication channel.

5. The communication device as in the claim 1, wherein the output device is a display for displaying the specific information as the coded image, and
the output instruction is an instruction to display the specific information as the coded image on the display.

6. The communication device as in the claim 1, wherein the first wireless interface is configured to simultaneously establish the first type wireless connection using a first media access control (MAC) address and the second type wireless connection using a second MAC address different from the first MAC address,
wherein the instructions, when executed by the one or more processors, cause the communication device to:
control a display to display one or more selection screens, wherein the one or more selection screens comprise a first selection area for establishing the first type wireless connection and a second selection area for establishing the second type wireless connection,
wherein the output instruction for establishing the first type wireless connection includes selecting the first selection area, and
the output instruction for establishing the second type wireless connection includes selecting the second selection area.

7. The communication device as in the claim 1, wherein the second external device is an access point.

8. The communication device as in the claim 1, wherein the connection information comprises authentication information for authenticating information received from the second external device.

9. The communication device as in the claim 1, wherein the instructions, when executed by the one or more processors, further cause the communication device to control the communication device to operate as an enrollee conforming to a Wi-Fi standard, and
wherein the terminal device operates as a configurator conforming to the Wi-Fi standard.

10. The communication device as in claim 1,
wherein the second wireless connection comprises a Wi-Fi connection, and
wherein the communication device receives a configuration object that is used to configure the Wi-Fi connection and that conforms to a Wi-Fi standard associated with the Wi-Fi connection.

11. The communication device as in claim 1, wherein the terminal device is different from the second external device.

12. A communication device comprising:
a first wireless interface;
a second wireless interface configured to send specific information including a public key of the communication device in response to receiving an output instruction which is a request signal from a terminal device;
one or more processors; and
memory storing instructions that, when executed by the one or more processors, cause the communication device to:
after the public key is obtained by the terminal device which receives the specific information sent from the second wireless interface, receive, from the terminal device via the first wireless interface, an authentication request generated using the public key;
send, to the terminal device via the first wireless interface, an authentication response responsive to the authentication request;
after the authentication response is sent to the terminal device, receive, from the terminal device via the first wireless interface, connection information for establishing a second wireless connection between the communication device and a second external device via the first wireless interface; and
after the connection information is received from the terminal device, establish, using the connection information, the second wireless connection between the communication device and the second external device,
wherein the first wireless interface is capable of simultaneously establishing a first type wireless connection and a second type wireless connection different from the first type wireless connection, if the output instruction for establishing the second type wireless connection is accepted in a state where a first wireless connection which is the first type wireless connection via the first wireless interface is established between the communication device and a first external device different from the second external device, the first wireless connection is not disconnected, and if the output instruction for establishing the first type wireless connection is accepted in a state where the first wireless connection which is the second type wireless connection via the first wireless interface is established between the communication device and the first external device, the first wireless connection is not disconnected, wherein the first type wireless connection is an access point (AP) type wireless connection which is a wireless connection between the communication device and an access point, and the second type wireless connection is a non-AP type wireless connection which is a wireless connection between the communication device and another device which is not the AP.

13. The communication device as in the claim 12, wherein the instructions, when executed by the one or more processors, further cause the communication device to shift an operating condition of the communication device from an inactive condition to an active condition, wherein the inactive condition is a condition where the authentication response is not sent even if the authentication request is received from the terminal device, and wherein the active condition is a condition where the authentication response is sent to the terminal device in response to receiving the authentication request from the terminal device.

14. The communication device as in the claim 13, wherein the specific information is a code image obtained by coding the public key and communication channel information, wherein the communication channel information indicates a first communication channel predetermined in the communication device, and wherein, in the active condition, the communication device monitors the first communication channel for the authentication request and sends the authentication response in response to receiving the authentication request.

15. The communication device as in the claim 14, wherein the second wireless connection is established between the communication device and the second external device using a second communication channel, and wherein the second communication channel is different from the first communication channel.

16. The communication device as in the claim 12, wherein the second external device is an access point.

17. The communication device as in the claim 12, wherein the connection information comprises authentication information for authenticating information received from the second external device.

18. The communication device as in the claim 12, wherein the instructions, when executed by the one or more processors, further cause the communication device to control the communication device to operate as an enrollee conforming to a Wi-Fi standard, and wherein the terminal device operates as a configurator conforming to the Wi-Fi standard.

19. The communication device as in claim 12, wherein the second wireless connection comprises a Wi-Fi connection, and wherein the communication device receives a configuration object that is used to configure the Wi-Fi connection and that conforms to a Wi-Fi standard associated with the Wi-Fi connection.

20. The communication device as in claim 12, wherein the terminal device is different from the second external device.

* * * * *